(12) United States Patent
Tomita

(10) Patent No.: US 7,366,744 B2
(45) Date of Patent: Apr. 29, 2008

(54) FILE MANAGEMENT DEVICE AND FILE MANAGEMENT METHOD

(75) Inventor: Nobuyoshi Tomita, Tokyo (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 10/544,620

(22) PCT Filed: Dec. 13, 2004

(86) PCT No.: PCT/JP2004/018599

§ 371 (c)(1),
(2), (4) Date: Aug. 5, 2005

(87) PCT Pub. No.: WO2005/066960

PCT Pub. Date: Jul. 21, 2005

(65) Prior Publication Data

US 2006/0149750 A1    Jul. 6, 2006

(30) Foreign Application Priority Data

Jan. 7, 2004    (JP) .............................. 2004-002515

(51) Int. Cl.
*G06F 17/30* (2006.01)
(52) U.S. Cl. .................. 707/205; 369/30.9; 369/53.21; 84/609
(58) Field of Classification Search ............. 707/104.1; 84/609; 369/30.9, 53.21
See application file for complete search history.

(56) References Cited

U.S. PATENT DOCUMENTS 5,869,782 A * 2/1999 Shishido et al. .............. 84/609

| | | | | |
|---|---|---|---|---|
| 6,198,877 B1 * | 3/2001 | Kawamura et al. | ........... | 386/98 |
| 2001/0038578 A1 * | 11/2001 | Oshima | ........................ | 369/13 |
| 2004/0004885 A1 * | 1/2004 | Comps et al. | .............. | 365/222 |
| 2004/0130975 A1 * | 7/2004 | Kii et al. | .................. | 369/30.09 |
| 2004/0148543 A1 * | 7/2004 | Eto et al. | ........................ | 714/5 |

FOREIGN PATENT DOCUMENTS

JP    11-176137    7/1999

(Continued)

*Primary Examiner*—Don Wong
*Assistant Examiner*—Hanh B Thai
(74) *Attorney, Agent, or Firm*—Oblon, Spivak, McClelland, Maier & Neustadt, P.C.

(57) ABSTRACT

The present invention relates to a data recording/reproducing apparatus (1), which includes a reader (3) for reading content data recorded in a minidisc (2), and a controller (4) for generating one file by gathering a plurality of content units not continued with each other to the read contents data and executing a process for generating relative position information of each content unit when the file is generated. The controller further divides the content unit into parts at a discontinuous point if each content unit for constituting the generated file includes a discontinuous area on a recording medium in case of reading the relative position information by the reader, and generates absolute position information on the recording media of each part. The relative position information of the content unit for constituting the read file and the absolute position information of the parts are stored in a table memory (6). The read file is expanded in an expansion memory (7) as temporary storage means by the parts and the absolute position information, and the expanded parts are subjected to an editing process including any of dividing, combining, erasing, track number moving by a data editor (8).

5 Claims, 28 Drawing Sheets

FOREIGN PATENT DOCUMENTS

| | | |
|---|---|---|
| JP | 2000-83217 | 3/2000 |
| JP | 2001-75856 | 3/2001 |
| JP | 2001-103424 | 4/2001 |
| JP | 2003-100018 | 4/2003 |
| WO | 03/083869 | 10/2003 |

* cited by examiner

| Encoding system | |  |
|---|---|---|
| Copyright management information | Key information | |
| Parts number | Artist name | Title |
| Original music order | Recording time | |

FIG.20

FILE MANAGEMENT DEVICE AND FILE MANAGEMENT METHOD

TECHNICAL FIELD

The present invention relates to a file management apparatus and a file management method, and more particularly to a file management apparatus and a file management method which records data in a recording medium which records the data in a format capable of easily editing the data.

This application claims priority of Japanese Patent Application No. 2004-002515, filed on Jan. 7, 2004, the entirety of which is incorporated by reference herein.

BACKGROUND ART

Heretofore, for a recording medium, such as a disc, etc., techniques for a large capacity have been variously developed. It is also demanded that recording and reproducing of various data, etc., such as, for example, audio data, data for a computer application for one medium can be realized. Regarding development of general-purpose media, compatibility and consistency of a conventional recording/reproducing apparatus, etc. are important. It is preferable as seen physically that conventional resources can be effectively utilized.

A Minidisc (MD: Registered Trademark) of one type of a magneto-optical disc which has been widely used will be described as an example. The minidisc is a magneto-optical disc having a diameter of 64 mm, which can record and reproduce audio data of music, etc. In the minidisc, audio data is recorded by being compressed to the data amount of ⅕ to 1/10 by an ATRAC system. As an example of audio data, the minidisc can record the data of the amount for about 80 to 160 min. The minidisc adopts a file system which realizes high editability, such as dividing, combining, erasing, track number moving, etc. for recording data.

There has been proposed a technique for reproducing content data such as music, video, etc. recorded in package media such as CD-DA (Compact Disc Digital Audio), DVD (Digital Versatile Disc), etc. by a personal computer (PC), and by using an HDD (Hard Disc Drive) of the PC as a primary recording medium, copying or moving the content data to the minidisc that is a secondary recording medium.

In the technique heretofore proposed, it has been realized to manage the right of the contents even if transfer data is encrypted at data transfer time between the PC and a terminal and further the content data (data as a unit of a musical song, etc., called a tracks) is edited, and to take the consistency of so called check-in (transfer of rights)/check out (return of rights) in an SDMI (Secure Digital Music Initiative) system.

Since the minidisc for audio can be easily acquired by a user, it is very convenient if this minidisc can be widely utilized other than the application of music, for data storage media, etc for a computer. However, since the recording capacity of the minidisc is small, about 160 MB, an area for recording copyright protection information of ID, etc. peculiar to media is not prepared. Therefore, on the assumption that the minidisc is used as a wide data storage for music and/or video distribution, etc., there is a problem that the minidisc cannot be dealt with a request of copyright protection, etc. of the distributed contents. Further, since the minidisc adopts a managing system (PTOC (Premastered Table Of Contents), UTOC (User Table Of Contents)) by a specific managing area except audio data recording area, it is difficult to deal, for example, with a general-purpose file system application, such as an FAT system, etc. Furthermore, if data except audio is recorded in a track under the UTOC management, a fault is generated, such as generation of abnormal noise at a reproducing time in many audio devices (MD players). That is, if it is assumed that the minidisc for audio is used as general-purpose storage media, a recording capacity, a managing system, specific information related to copyright protection, etc., faults in conventional type become problems.

As a standard for the purpose of data recording except audio data in the minidisc system, the disc standards called "MD-DATA", or "MD-CLIP" have already been developed. However, the MD-DATA does not satisfy the above-mentioned demand, because it is a dedicated disc different from the MD for audio, usable only for dedicated recording/reproducing apparatus for the MD-DATA, has a recording capacity of about 140 MB, and so on. Further, since the MD-CLIP can use the MD for audio and utilizes an inner peripheral part out of UTOC management, there is no inconvenience in a conventional audio device, but since the general-purpose recording area is only about 2 MB, its application is limited by itself.

Therefore, there is proposed a next-generation minidisc in which the above-mentioned faults are solved by narrowing a track pitch and making improvements in changing a linear speed and a modulation method to realize a high density of recording data, and further providing a normal recording area a conceal area (secure area) usable by an authentication. These next-generation minidiscs adopt a new managing data configuration different from the UTOC, and record specific data by encrypting unlike the conventional minidisc which records a plain text. In the next-generation minidisc, data such as musical contents, video contents, etc., in which a copyright is created is recorded by a predetermined format in a secure area and the secure area can be reproduced only by a device which can be referred to. In the minidisc in which a new modulation method is adopted, since musical data of high tone quality can be recorded and reproduced for a long time, the number of musical songs to be managed by one disc becomes large. Further, this minidisc intends to take affinity with a computer by managing data by using an FAT file system.

However, in the file system such as an FAT file system, etc., when a series of musical files or video files are divided on the way of a cluster by dividing, combining, erasing, track number moving, etc., it is necessary to move the one of the divided clusters to another area. Then, continuous reproducing of the divided files becomes difficult. Further, if the musical file is, for example, reproduced from the midway of the track, it is necessary to trace the continuous information (cluster link table) of the cluster for acquiring the cluster number on the disc, and hence it has taken a much time to calculate for the reproducing process. If reverse reproducing is executed, a cluster link in reverse direction must be formed, and hence there is a problem that many memories must be consumed.

DISCLOSURE OF THE INVENTION

Problems to be Solved by the Invention

An object of the present invention is to provide a novel file management apparatus and file management method which can eliminate the problem of the conventional art.

Another object of the present invention is to provide a file management apparatus and a file management method which can hold continuity on a disc even when a musical track is divided in an editing process.

The file management apparatus according to the present invention comprises: a file generating means for generating one file by gathering a plurality of content units not continuous with each other; a relative position information generating means for generating relative position information of each content unit on the file as managing information for managing the content unit when the file is generated by the file generating means; and a position information recording means for recording the relative position information on the recording medium.

The file management apparatus according to the present invention further comprises: a reading means for reading the generated file and relative position information recorded in a recording medium; a dividing means for dividing the content unit for constituting the file generated by the file generating means into parts at a discontinuous point and generating absolute position information on the recording medium of the respective parts if the content unit is made of a discontinuous area on the recording medium when the relative position information is read by the reading means; a table storage means for storing a corresponding table that associates the relative position information of the content unit for constituting the read file with the parts and the absolute position information; a temporary storage means for expanding the read file by the parts and the absolute position information; and a data editing means for executing a editing process including at least any of the dividing, the combining, the erasing and the track number moving for the parts expanded to the temporary storage means. The file management apparatus executes an editing operation such as dividing, combining, erasing or track number moving data expanded to the temporary storage means based on the association of the relative position information of the content unit constituting the read file stored in the table storage means with the parts and the absolute position information.

Here, the content file includes a musical file and a video file. When the content file is the musical file, the content unit is a track as a segmentation of each musical song, and when the content file is the video file, the content unit is a chapter.

The file management method according to the present invention comprises: a file generating step of generating one file by gathering a plurality of content units not continuous to each other; a relative position information generating step of generating relative position information of each content unit on the file as managing information for managing the content unit when the file is generated in the file generating step, and a position information recording step of recording the relative position information on the recording medium.

The file management method according to the present invention further comprises: a reading step of reading the generated file and relative position information recorded in the recording medium; a dividing step of dividing the content unit for constituting the file generated in the file generating step into parts at a discontinuous point and generating absolute position information on the recording medium of the respective parts if the content unit is made of a discontinuous area on the recording medium when the relative position information is read in the reading step; a step of expanding the file read based on a corresponding table that associates the relative position information of the content unit for constituting the read file with the parts and the absolute position information; and a data editing step of executing the editing process including at least any of the dividing, the combining, the erasing and the track number moving for the parts expanded to the temporary storage means. Thus, the editing process such as the dividing, the combining, the erasing and the track number moving are executed to the expanded data based on the association of the relative position information of the content unit constituting the read file with the parts and the absolute position information.

According to the file management apparatus and the file management method in accordance with the present invention, even if the musical track is divided by the editing process, the continuity on the disc can be held.

Other objects and advantages of the present invention will become more apparent from the following description of the preferred embodiments of the present invention in reference to the accompanying drawings.

BRIEF DESCRIPTION OF THE DRAWINGS

FIG. 20 is a view showing a track information table by an example of a managing system of audio data;

FIG. 26 is a view showing that a plurality of name slots by an example of a managing system of audio data can be referred to;

BEST MODE FOR CARRYING OUT THE INVENTION

A file management apparatus and a file management method according to the present invention will be described with reference to the accompanying drawings.

The file management apparatus according to the present invention is a recording/reproducing apparatus of a recording medium which can handle different data formed of different formats like, for example, audio data, PC data, etc. As the recording medium, any recording medium which can record a large capacity can be used without limit of a semiconductor memory, a disc-like recording medium, etc. In this example, a minidisc (Registered Trademark) of disc-like magneto-optical recording medium is used. Particularly, a data recording apparatus of this example deals with, in addition to a conventional minidisc, a minidisc which realizes a high density of recording data by narrowing a track pitch and making improvements in changing a linear speed and a modulation method, and further provides a normal recording area and a conceal area (secure area) usable by an authentication.

This minidisc records data on a disc by encrypting unlike the conventional minidisc for recording a plain text at a disc recording time. Then, in this minidisc, data such as musical contents, video contents, etc. which creates a copyright are recorded in a conceal area in a predetermined format, and can be reproduced only by a device which can refer to this conceal area. In this example, as the contents, musical contents are adopted, and the ATRAC (Registered trademark) format audio data is handled as specific data recordable in this conceal area. The data such as an MP3 (MPEG1 Audio Layer-3) format, a WMA (Windows Media Audio) format, etc., audio data except the ATRAC, image data, text data, etc. is recorded in a normal recording area. The details of the minidisc having the conceal area and the normal recording area will be described later.

Figure 1:
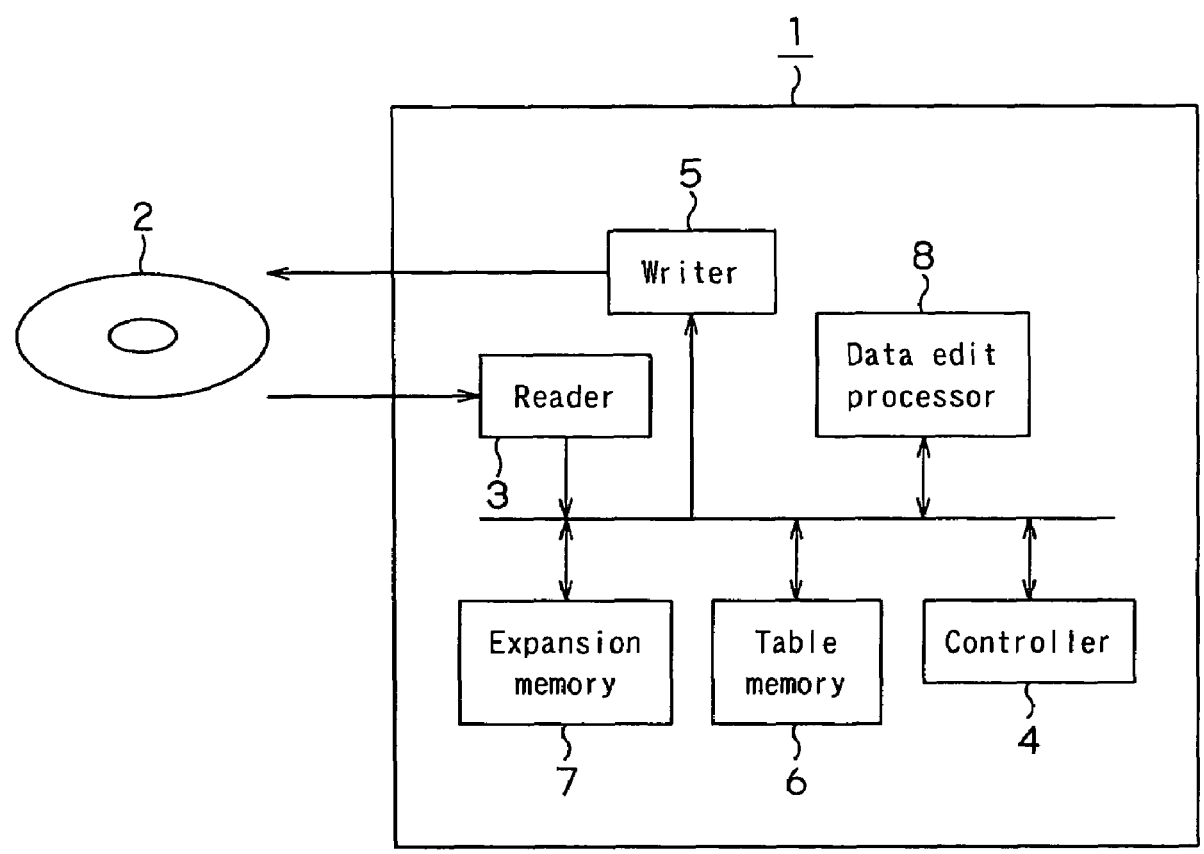
FIG. 1 is a block diagram showing a data recording/reproducing apparatus according to the present invention.

A preferred embodiment of a data recording/reproducing apparatus 1 of the present invention is shown in FIG. 1. The data recording/reproducing apparatus 1 comprises a reader 3 for reading content data recorded in a minidisc 2, and a controller 4 for generating one file by gathering a plurality of content units not continuous with each other to the read content data and executing a process for generating relative position information of each content unit in the file as managing information for managing the content unit when the file is generated. The controller 4 further divides the content unit into parts at a discontinuous point if each content unit for constituting the generated file includes a discontinuous area on a recording medium when the relative position information is read by the reader 3, and generates absolute position information in the recording medium of each part.

The relative position information of the content unit for constituting the read file and the absolute position information of the parts are stored in a table storage unit 6 as a corresponding table. These read files are expanded in an expansion memory 7 as a temporary storage means by the parts and the absolute position information, and an editing process including dividing, combining, erasing and track number moving is executed by a data editor 8 for the expanded parts. The relative position information generated from the controller 4 is written at a predetermined position of the minidisc by the writer 5.

Figure 2:
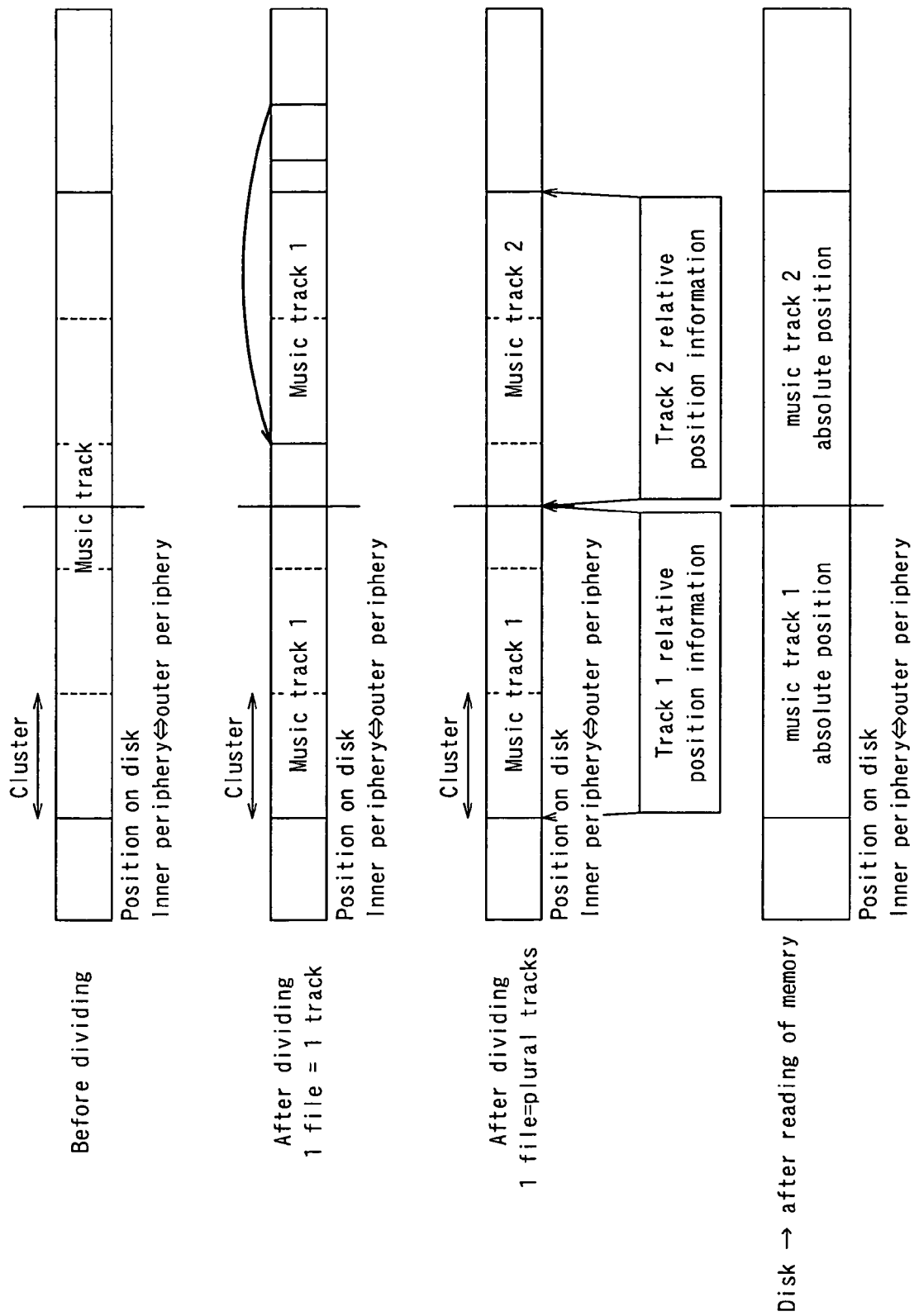
FIG. 2 is a process view showing a processing step of editing or updating data in the data recording/reproducing apparatus.

The file management of the data recording/reproducing apparatus 1 will be described with reference to FIG. 2. In the FAT file system, if a series of musical files or video files are divided by dividing, combining, erasing, track number moving, etc. on the way of the cluster, one of the divided clusters is moved to another area. At this time, the data recording/reproducing apparatus 1 generates one file by gathering a plurality of tracks of the musical file so that even if the musical track is divided, the continuity on the disc may not be collapsed, and records the musical file at a predetermined position of the minidisc. At this time, the data recording/reproducing apparatus 1 generates and records the relative position information of each musical track in the file newly generated as managing information for managing the musical tracks in the generated file.

When the editing process and an updating process of recorded data are executed, the data recording/reproducing apparatus 1 reads the generated file and the relative position information recorded in the recording medium in the memory as a working area in the data recording/reproducing apparatus. At this time, if the respective musical tracks for constructing the file includes discontinuous clusters in the recording medium, the data recording/reproducing apparatus 1 divides the musical tracks into "parts" at discontinuous points, generates absolute position information in the recording medium of the respective parts, and forms a corresponding table that associates the relative position information with the absolute position information in the file of the musical track. The editing process and the updating process, such as dividing, combining, erasing, track number moving, etc. to the recorded data are executed based on the absolute position information of the parts expanded in the expansion memory 7.

Figure 3:
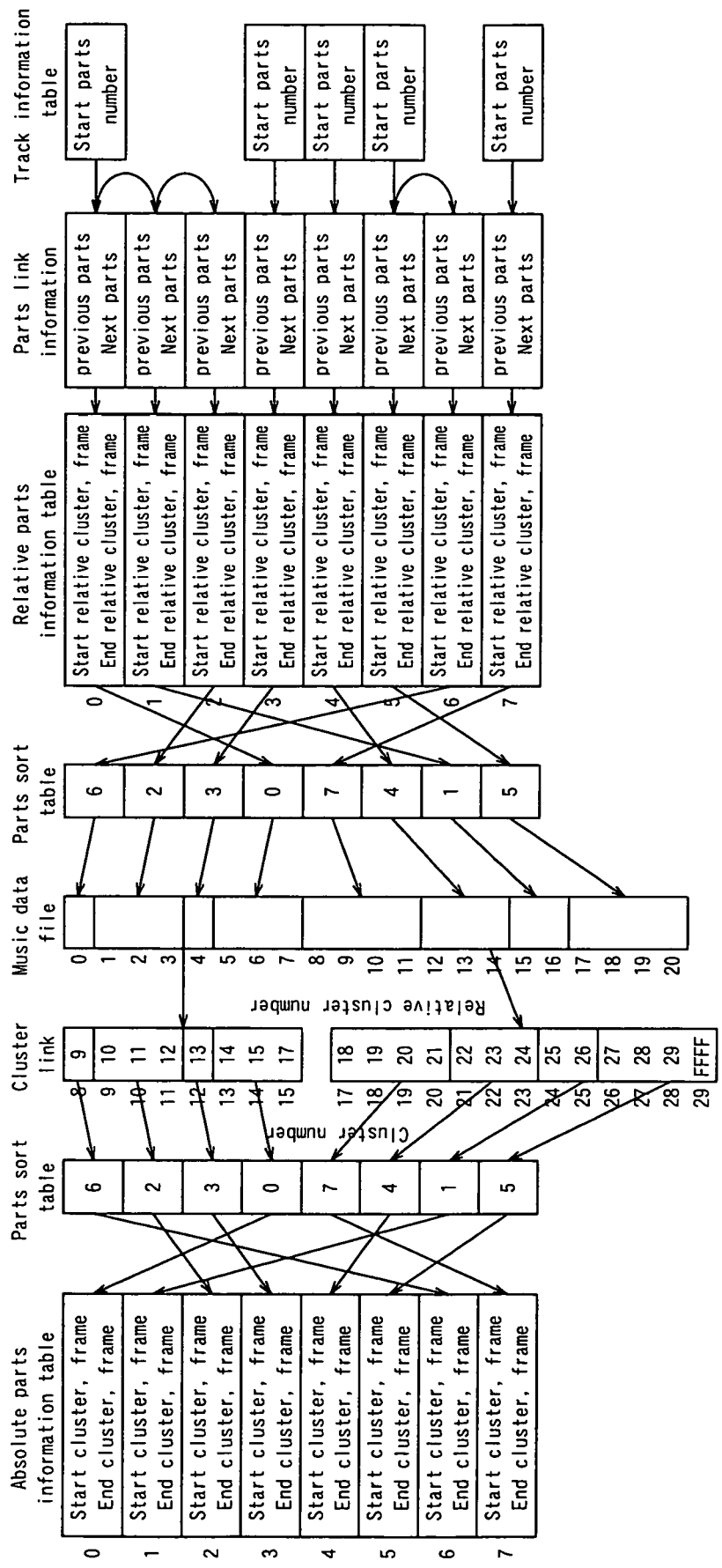
FIG. 3 is a process view showing a file updating processing step at a disc reading time in the data recording/reproducing apparatus.

A file updating process at a disc reading time by the data recording/reproducing apparatus 1 will be described by referring to FIG. 3. In FIG. 3, a track information table, parts link information, a relative parts information table and a cluster link are pieces of information recorded on the disc, and a parts sort table and an absolute parts information table are pieces of information formed in the expansion memory 7. The data recording/reproducing apparatus 1 refers to the parts link from the parts number of the musical track referred to by the track information table. Here, start relative cluster and frame, end relative cluster and frame of the parts of the respective musical tracks constructed as one file are shown. The data recording/reproducing apparatus 1 sorts the respective parts to the parts sort table according to the order shown in the relative parts information table. The data recording/reproducing apparatus 1 counts the relative cluster number while tracing the cluster link, and registers the cluster number in the absolute parts information table when the relative cluster number coincides with the start or end relative cluster number of the parts. If the cluster was discontinuous on the way of the parts, the parts are divided at the discontinuous point, and then the parts of divided rear half parts are registered as new parts in the absolute parts information table.

Figure 4:
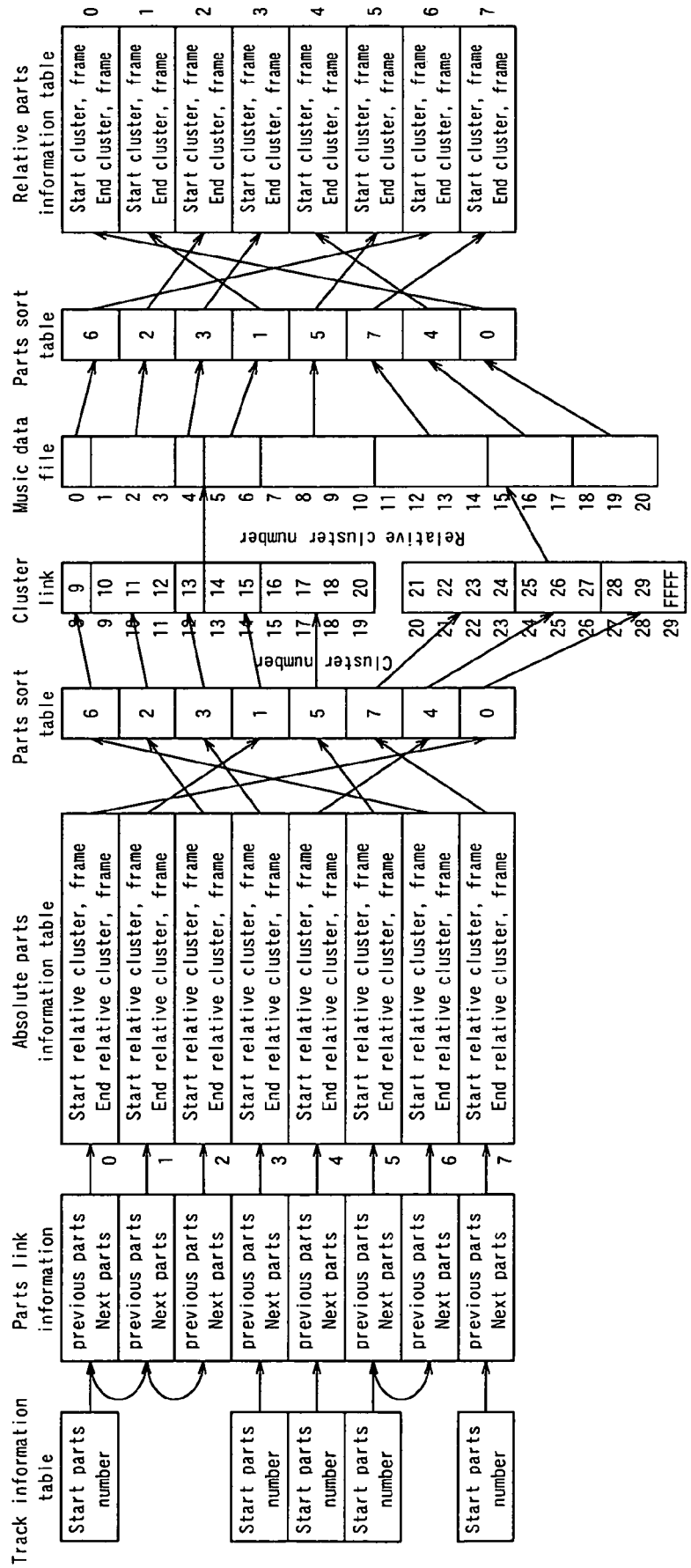
FIG. 4 is a process view showing a file updating process step at a disc writing time in the data recording/reproducing apparatus.

On the other hand, as shown in FIG. 4, at a disc writing time, the data recording/reproducing apparatus 1 refers to the parts link from the parts number of the musical track referred to by the track information table. The respective parts referred by this parts link information are sorted to a parts sort table according to the order shown in the absolute parts information table. The data recording/reproducing apparatus 1 counts the relative cluster number while tracing the cluster link, and registers the relative cluster number with the relative parts information table when the cluster number coincides with the start or end cluster number.

Thus, the data recording/reproducing apparatus 1 can hold continuity in the disc even when the musical track is divided by the editing process, and can further finish tracing of the cluster link by one time.

Figure 5:
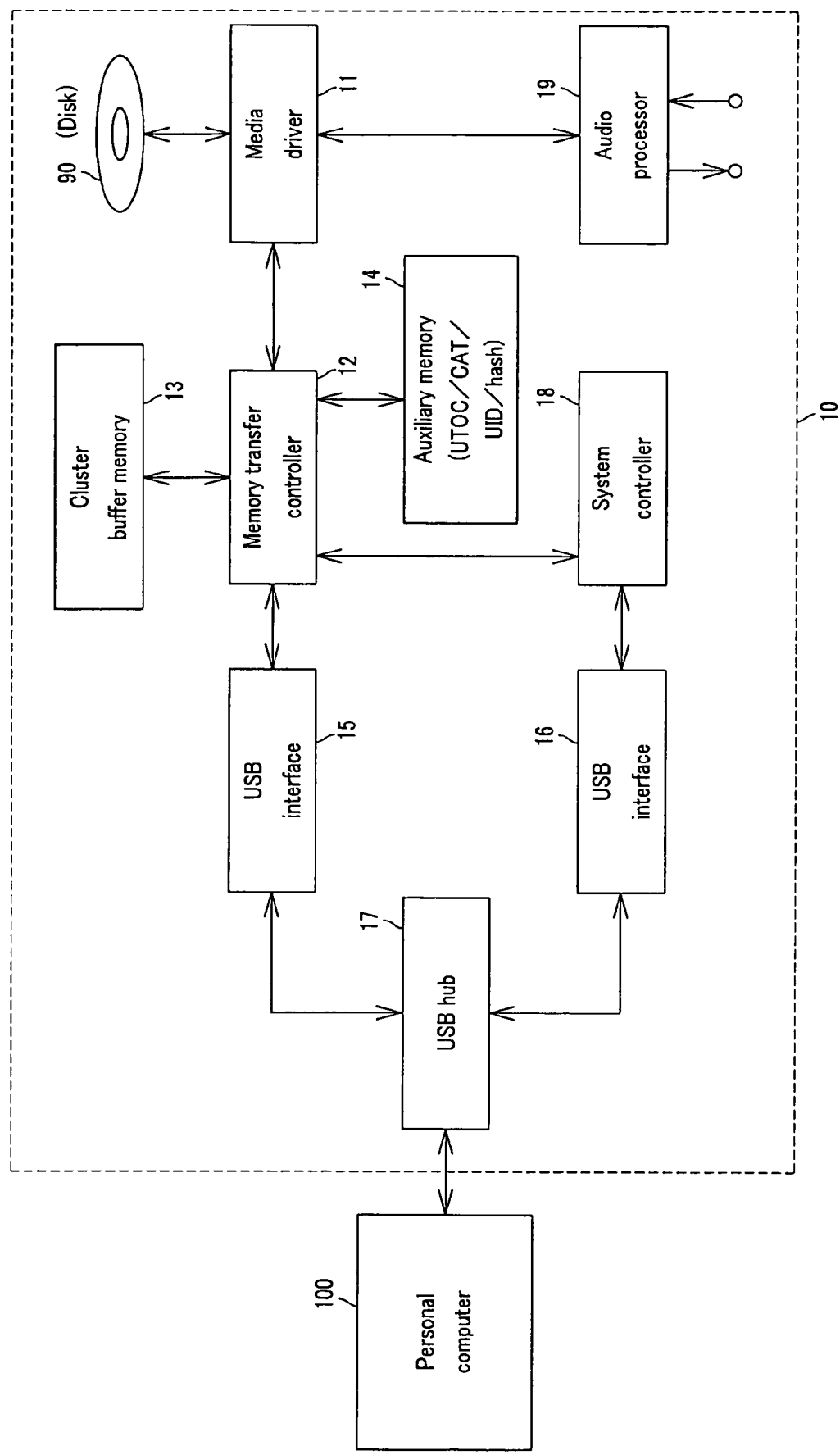
FIG. 5 is a block diagram showing the data recording/reproducing apparatus for recording/reproducing data with compatibility to next-generation MD 1 and next-generation MD 2.

The data recording/reproducing apparatus to which the present invention is applied will be described in detail with reference to the drawings. Data recorded in the concealing area of the minidisc used for the data recording/reproducing apparatus of this embodiment is audio file, and is data based on an ATRAC (Adaptive Transform Acoustic Coding) system, an ATRAC 3 system or ATRAC 3 plus system. The data recording/reproducing apparatus 1 comprises, as shown in FIG. 5, a media drive 11, a memory transfer controller 12, a cluster buffer memory 13, an auxiliary memory 14, USB interfaces 15, 16, a USB hub 17, a system controller 18, and an audio processor 19. The data recording/reproducing apparatus 1 can be connected to a personal computer (hereinafter, abbreviated as PC) 100. The minidisc can be used as audio data recording media, and can also be used as an external storage of the PC, etc.

The media drive 11 for constituting the data recording/ reproducing apparatus 1 records or reproduces data in the charged minidisc 90. An internal configuration of the media drive 11 will be described later.

The memory transfer controller 12 controls to transmit and receive reproduced data from the media drive 11 or the recording data supplied to the media drive 11. The cluster buffer memory 13 buffers the data read at a high density data cluster unit from the data track of the minidisc 90 by the media drive 11 based on the control of the memory transfer controller 12. The auxiliary memory 14 stores various types of management information, such as UTOC data, information for copyright protection to be recorded in a concealing area, information for checking data falsification, external device information for allowing accessing in a limited manner, etc. read from the minidisc 90 by the media drive 11 based on the control of the memory transfer controller 12.

The system controller 18 can communicate with the PC 100 connected through the USB interface 16 and the USB hub 17, controls the communication with this PS 100 to execute reception of a command, such as a write request, a read request, etc., transmission, etc. of static information, the other necessary information, and totally controls the entire data recording/reproducing apparatus 1. This system controller 18 instructs the media drive 11 so as to read the managing information, etc., from the minidisc 90 when the minidisc 90 is, for example, charged in the media driver 11, and stores the managing information, etc. of the PTOC, the UTOC, etc. read by the memory transfer controller 12. The system controller 18 reads these managing information and thereby grasps the track recording state of the minidisc 90.

Further, an area for recording content managing information including file information of contents data to be recorded and encrypted information of each content unit of the content data to be recorded is secured in a predetermined area of an innermost periphery of the minidisc at a disc initializing time.

The system controller 18 gives a signal of the effect that reading of data cluster including an FAT sector is executed for the media drive 11 if a reading request of a certain FAT sector is delivered from the PC 100. The read data cluster is written in the cluster buffer memory 13 by the memory transfer controller 12. However, if the data of the FAT sector is already stored in the cluster buffer memory 13, reading by the media drive 11 is not necessary. At this time, the system controller 18 gives a signal for reading the requested data of the FAT sector from the data of the high density data cluster written in the cluster buffer memory 13, and transmits the signal to the PC 100 through the USB interface 15, the USB hub 17, or controls for an audio reproducing process.

If the system controller 18 receives a write request in a certain FAT sector from the PC 100, the system controller 18 makes the media drive 11 execute reading of the data cluster including this FAT sector based on the auxiliary memory 14. The read data cluster is written in the cluster buffer memory 13 by the memory transfer controller 12. However, if the data of this FAT sector is already stored in the cluster buffer memory 13, the reading of the media drive 11 is not necessary. The system controller 18 supplies the data (recorded data) of the FAT sector transmitted from the PC 100 to the memory transfer controller 12 through the USB interface 15, and executes rewriting of the data of the corresponding FAT sector in the cluster buffer memory 13.

Furthermore, the system controller 18 instructs the memory transfer controller 12 to transfer the date of the data cluster stored in the cluster buffer memory 13 in the state that necessary FAT sector is rewritten as recorded data to the media drive 11. At this time, the media drive 11 modulates the recorded data of the data cluster by a modulation method corresponded by the attached minidisc, and writes the recorded data in the minidisc.

Incidentally, if the minidisc 90 has the concealing area and the normal recording area as in this embodiment and the data recorded in each area of the minidisc is predetermined, the system controller 18 instructs accessing based on the recording area in which the recorded/reproduced data is designated in response to the audio track or the data track to the media drive. The data recording/reproducing apparatus 1 allows recording only any one of the PC data or the audio data in the attached minidisc 90, and can control to inhibit recording of the data except this. That is, the data recording/ reproducing apparatus 1 can control so that the PC data and the audio data may not be mixed.

Incidentally, in the data recording/reproducing apparatus 1 of this embodiment, the above-mentioned recording/reproducing control is a control in case of recording/reproducing the data track, and the data transfer in case of recording/reproducing MD audio data in and from the audio track is executed through the audio processor 19.

The audio processor 19 has, for example, as an input system, an analog voice signal input unit such as a line input circuit/microphone input circuit, etc., an A/D converter and a digital audio data input unit. Further, the audio processor 19 has an ATRAC compression encoder/decoder, and a buffer memory of compressed data. Furthermore, the audio processor 19 has, as an output system, a digital audio data output unit, a D/A converter and an analog voice signal output unit such as a line output circuit/headphone output circuit, etc.

The audio data is recorded in the audio track of the minidisc 90 in case that the digital audio data or the analog voice signal is input to the audio processor 19. The linear PCM audio data obtained by being converted by the A/D converter after the inputted linear PCM digital audio data or the analog voice data is input, is subjected to ATRAC compression encoding, and is stored in the buffer memory. Thereafter, the linear PCM audio data is read from the buffer memory at predetermined timing (a data unit corresponding to an ADIP cluster), and transferred to the media drive 11. The media drive 11 writes the transferred compressed data in the concealing area of the minidisc 90 as the audio track by modulating the compressed data by an EFM modulation method or an RLL(1-7)PP modulation method. The data compressed by a compression technique except the ATRAC is written as general data in a normal recording area.

When the audio track is reproduced from the minidisc 90, the media drive 11 demodulates the reproduced data to an ATRAC compressed data state, and transfers the reproduced data to the audio processor 19. The audio processor 19 performs ATRAC compression decoding to make the reproduced data to linear PCM audio data, and outputs the linear PCM audio data from the digital audio data output unit. Alternatively, the linear PCM audio data is output as an analog voice signal by the D/A converter and the line output/headphone output is performed.

Incidentally, the structure shown in FIG. 5 is one example. When the data recording/reproducing apparatus 1 is used as an external storage device for recording/reproducing only the data track by connecting the data recording/reproducing apparatus 1 to the PC 100, the audio processor 19 becomes unnecessary. Meanwhile, when the audio signal is used mainly for the purpose of recording/reproducing, it is preferable to provide the audio processor 19 and further it is preferable to provide an operating unit and a display unit as user interfaces. Further, the connection to the PC 100 is not limited to the USB, but, for example, in addition to so-called IEEE 1394 interface according to the standards stipulated by IEEE (The Institute of Electrical and Electronics Engineers, Inc.), a general-purpose connection interface can be applied.

Subsequently, specification example of the minidisc 90 used in this embodiment will be described. The physical format of the conventional minidisc (and MD-DATA) is determined as below. A track pitch is 1.6 μm, a bit length is 0.59 μm/bit. Further, a laser wavelength λ is λ=780 nm, and the numerical aperture NA of an optical head is 0.45. As a recording system, a groove recording system in which grooves (grooves on a disc board surface) are used as tracks for recording/reproducing is adopted. As addressing schemes, there is adopted a recording system in which a single spiral groove is formed on a disc board surface, wobbles formed in a zigzag manner are formed in a predetermined frequency (22.05 kHz) at both sides of this groove, and an absolute address is FM-modulated with the above-mentioned frequency as a reference in a wobbled groove track. Incidentally, the absolute address recorded as the wobbles is also called an ADIP (Address in Pre-groove).

In the conventional MD, a main data section of 32 sectors and 4 sectors of link sectors added thereto, totally 36 sectors are used to record as one cluster unit. The ADIP signal includes a cluster address and a sector address. The cluster address includes 8 bit cluster H and 8 bit cluster L, and the sector address includes 4-bit sector. Further, in the conventional minidisc, as the recording data modulation method, an EFM (8-14 conversion) modulation is adopted. As an error correction technique, an ACIRC (Advanced Cross Interleave Reed-Solomon Code) is used. The data interleave adopts a convolutional type. Thus, the redundancy of the data becomes 46.3%.

Also, a data detecting system of the conventional minidisc is a bit-by-bit system, and as a disc drive system, a CLV (Constant Linear Velocity) is adopted. The linear velocity of the CLV is 1.2 m/sec. The standard data rate at recording/reproducing time is 133 kB/sec, a recording capacity is 164 MB (140 MB in the MD-DATA). The minimum rewrite unit (unit cluster) of data includes 36 sectors of 32 main sectors and 4 link sectors as described above.

The data recording/reproducing apparatus 1 of this embodiment realizes a high density of recording data by narrowing a track pitch and making improvements in changing a linear velocity and a modulation method, in addition to the conventional minidisc, and deals with a next-generation minidisc which includes a normal recording area and a concealing area (secure area) usable by an authentication. There have been proposed two types as the next-generation minidisc.

The next-generation MD 1 has the same physical specifications of a recording medium as the above-mentioned conventional minidisc. Therefore, its track pitch is 1.6 μm, its laser wavelength λ is λ=780 nm, and the aperture rate of an optical head is NA=0.45. As a recording system, a groove recording system is adopted. As addressing schemes, an ADIP is used. Thus, since the structure of the optical system of a disc drive, an ADIP address reading system, and a servo process are similar to the conventional minidisc, compatibility with the conventional disc is achieved. The next-generation MD 1 adopts an RLL(1-7)PP modulation method (RLL: Run Length Limited, PP: Parity preserve/Prohibit rmtr (repeated minimum transition runlength)) conformed to the high density recording as recording data modulation method. Also, as error correction system, RS-LDC (Reed Solomon-Long Distance Code) system with BIS (Burst Indicator Subcode) having higher correction ability is used. In the above-mentioned data structure, a data interleave is a block conclusion type. Thus, the redundancy of the data becomes 20.50%. As data detection system, a Viterbi decoding technique by PR(1, 2, 1) ML is used.

In a disc drive system, a CLV system is used. Its linear velocity is set to 2.4 m/sec. The standard data rate at recording/reproducing time is 4.4 MB/sec. This system is adopted so that its total recording capacity can be set to 300 MB. The modulation method is changed from EFM to RLL(1-7)PP modulation method so that a window margin is changed from 0.5 to 0.666. Accordingly, a high density of 1.33 times as large as the conventional one can be realized. Also, the cluster of the minimum rewrite unit of data includes 16 sectors, 64 kB. Thus, the recording modulation method is changed from CIRC system to the system in which the RS-LDC system with the BIS, the difference of the sector structure and the Viterbi decoding are used. Since a data efficiency is changed from 53.7% to 79.5%, high density of 1.48 times as large as the conventional one can be realized. When they are colligated, the next-generation MD 1 can increase a recording capacity to 30 MB of about twice as large as the conventional minidisc.

On the other hand, the next-generation MD 2 is a recording medium to which a high density recording technique, such as a domain wall displacement detection (DWDD) technique, etc. is applied, and has a different physical format from the above-mentioned conventional minidisc and the next-generation MD 1. The next-generation MD 2 has a track pitch of 1.25 µm, a bit length of 0.16 µm/bit, and is increased in density in a linear direction. Further, in order to take compatibility between the conventional minidisc and the next-generation MD 1, an optical system, reading system, servo process, etc. are based on the conventional standards, and a laser wavelength λ is λ=780 nm, and the numerical aperture of the optical head is NA=0.5. A recording system is a groove recording system, and addressing schemes are system using the ADIP. Also, the profile of a housing is the same standards as the conventional minidisc and the next-generation MD 1.

However, when the track pitch narrower than the conventional one and a linear density (bit length) are read as described above by using an optical system equivalent to the conventional minidisc and the next-generation MD 1, it is necessary to eliminate a detrack margin, a crosstalk from a land and a groove, a crosstalk from wobbles, focus leakage, a restriction in a CT signal, etc. Therefore, in the next-generation MD 2, points of changing the groove depth, inclination, width, etc. of the groove are characteristic. More particularly, the range of the groove depth of the groove is defined to 160 to 180 nm, the inclination is defined to 60☐ to 70☐, and the width is defined to 600 to 800 nm.

Also, the next-generation MD 2 adopts an RLL(1-7)PP modulation method (RLL: Run Length Limited, PP: Parity preserve/Prohibt rmtr (repeated minimum transition run-length)) adapted to high density recording as a recording data modulation method. Further, as the error correction system, RS-LDC (Reed Solomon-Long Distance Code) system with BIS (Burst Indicator Subcode) having higher correction ability is adopted. The data interleave is a block conclusion type. Thus, the redundancy of data becomes 20.50%. The data detection system uses the Viterbi decoding technique by a PR(1, −1) ML. Also, the cluster of the minimum rewrite unit of data is constructed by 16 sectors, 64 kB.

As a disc drive system, a ZCAV (Zone Constant Angular Velocity) system is used, and its linear velocity is 2.0 m/sec. The standard data rate at recording/reproducing time is 9.8 MB/sec. Accordingly, the next-generation MD 2 can set a total recording capacity to 1 GB by adopting a DWDD technique and this drive system.

Figure 6:
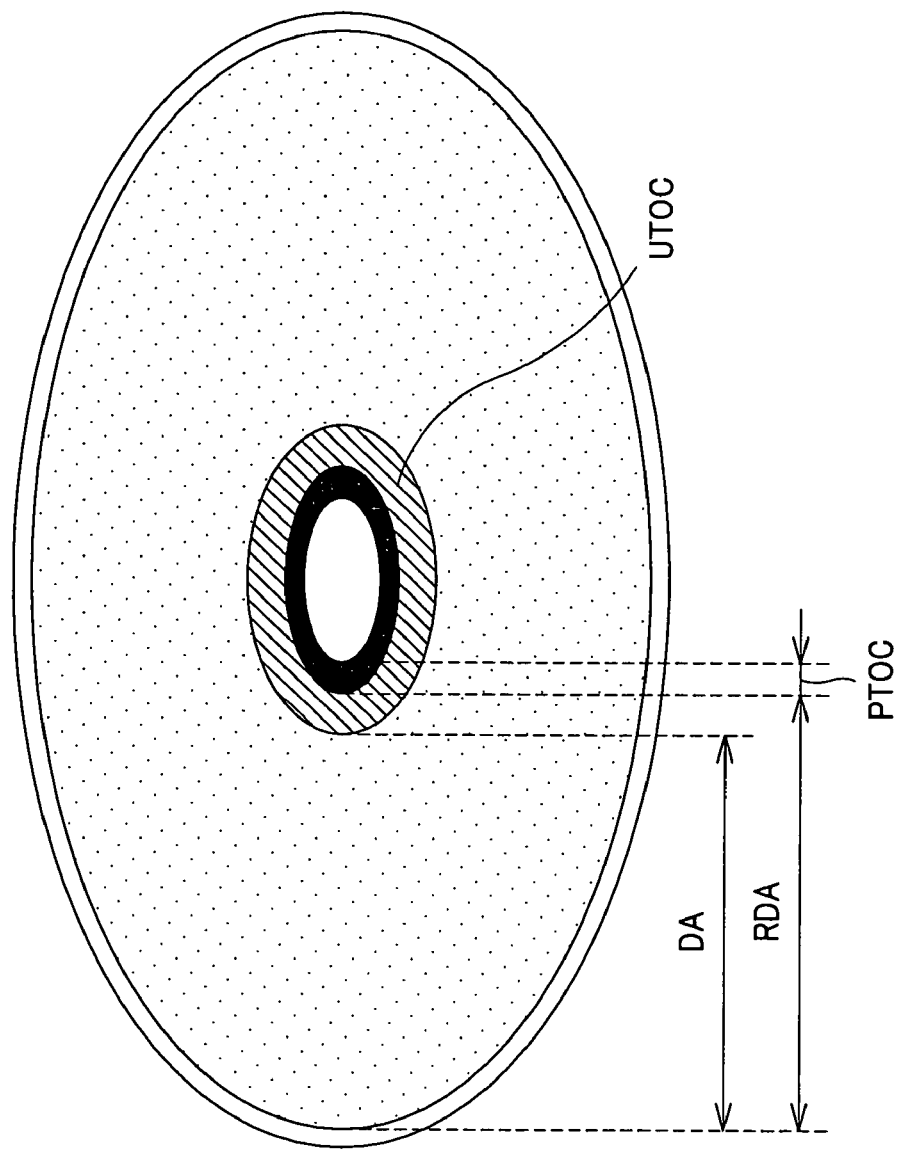
FIG. 6 is a perspective view of a disc showing an area configuration on a disc board of the next-generation MD 1.
Figure 7:
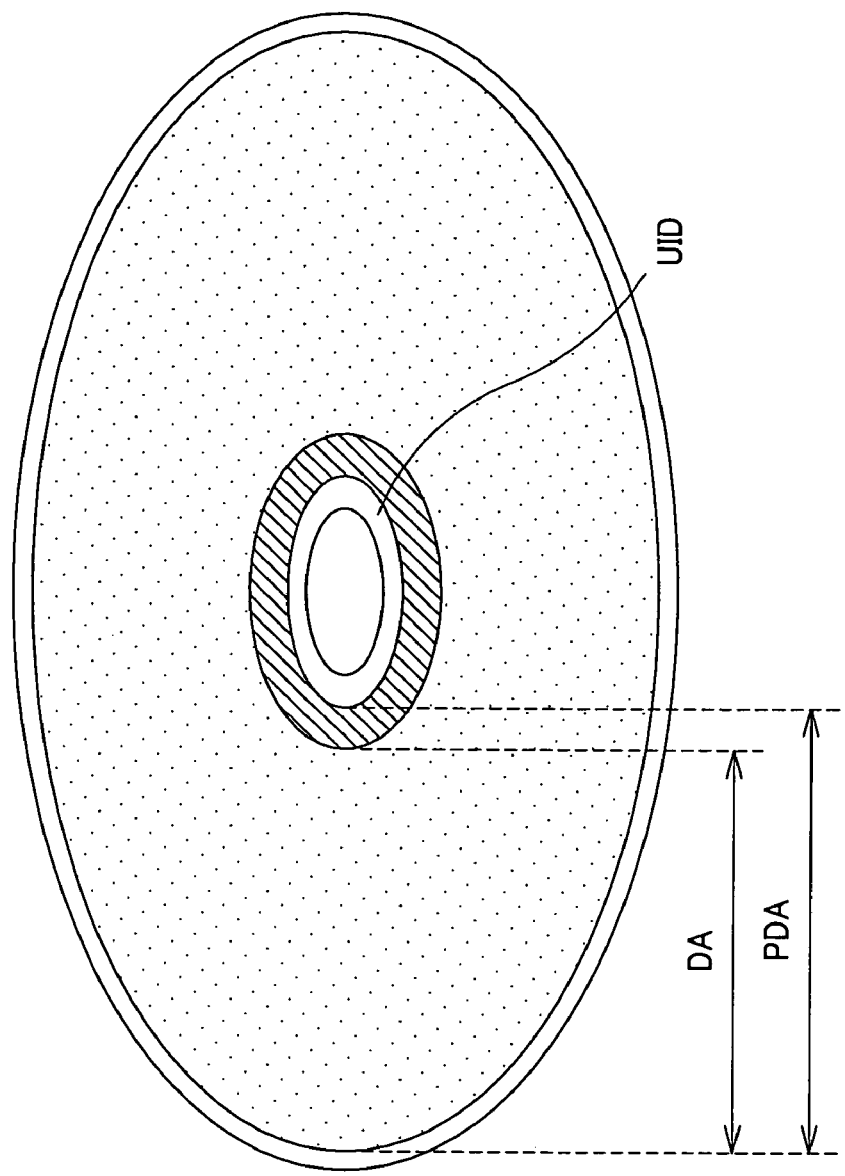
FIG. 7 is a perspective view of a disc showing an area configuration on a disc board of next-generation MD 2.

The area structure example on the board surface of the next-generation MD 1 shown in this embodiment is shown in FIG. 6 and FIG. 7. The next-generation MD 1 is the same medium as the conventional minidisc, and a PTOC (Premastered Table Of Contents) is provided as a premastered area at the innermost peripheral side of the disc. Here, disc managing information is recorded as an emboss pit by a physical structural deformation. The outer periphery from the premastered area is formed as a recordable area RDA capable of magneto-optical recording, and is a recordable/reproducible area formed with a groove as a guide groove of a recording track. The innermost peripheral side of this recordable area RDA is provided with a UTOC (User Table Of Contents) area, UTOC information is described in this UTOC area, and a buffer area with the premastered area PTOC and a power calibration area used for output power regulation, etc. of a laser beam are provided.

The next-generation MD 2 does not use, as shown in FIG. 7, a prepit for a high density. Therefore, the next-generation MD 2 does not have a PTOC area. In the next-generation MD 2, a unique ID area (Unique ID: UID) for recording information for copyright protection, information for checking data falsification, other closed information, etc. is provided on further inner peripheral area of a recordable area. This UID area is recorded by a recording system different from a DWDD technique applied to the next-generation MD 2.

Figure 8:
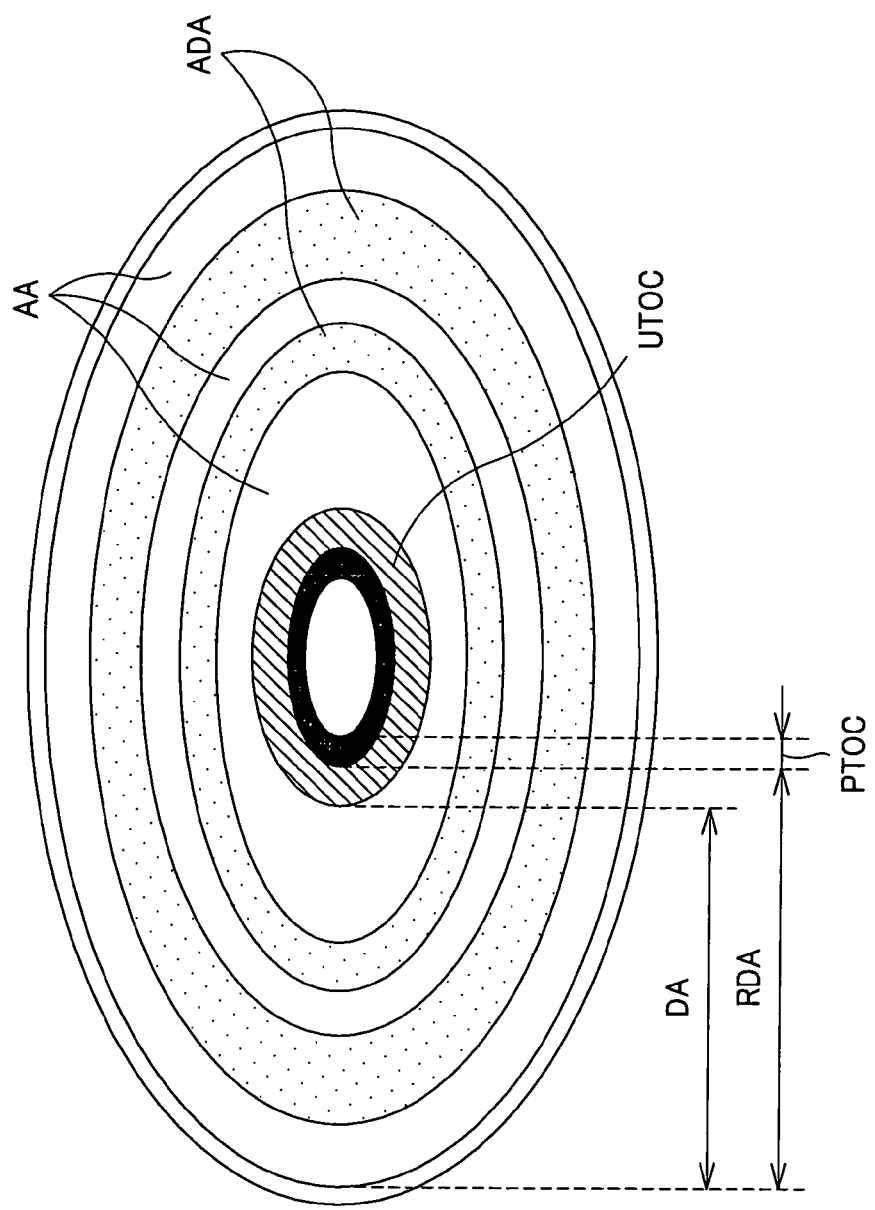
FIG. 8 is a perspective view of a disc showing an area configuration on a disc board when audio data and PC data are recorded in a mixed manner on the disc of the next-generation MD 1.

Incidentally, in the respective discs described here, an audio track of musical data and a data track can be recorded in a mixed manner. In this case, for example, as shown in FIG. 8, in the data area DA, an audio recording area AA which records at least one audio track, and a data recording area ADA for PC which records at least one data track are formed at respective arbitrary positions. A series of audio tracks and the data tracks are not always necessary to be recoded physically and continuously on the disc, but may be divided into a plurality of parts, and recorded. The parts indicate physically and continuously recorded sections. That is, even when physically separated two PC data recording areas exist on the disc, the number of the data tracks may sometimes be one, and may be plural.

Figure 9:
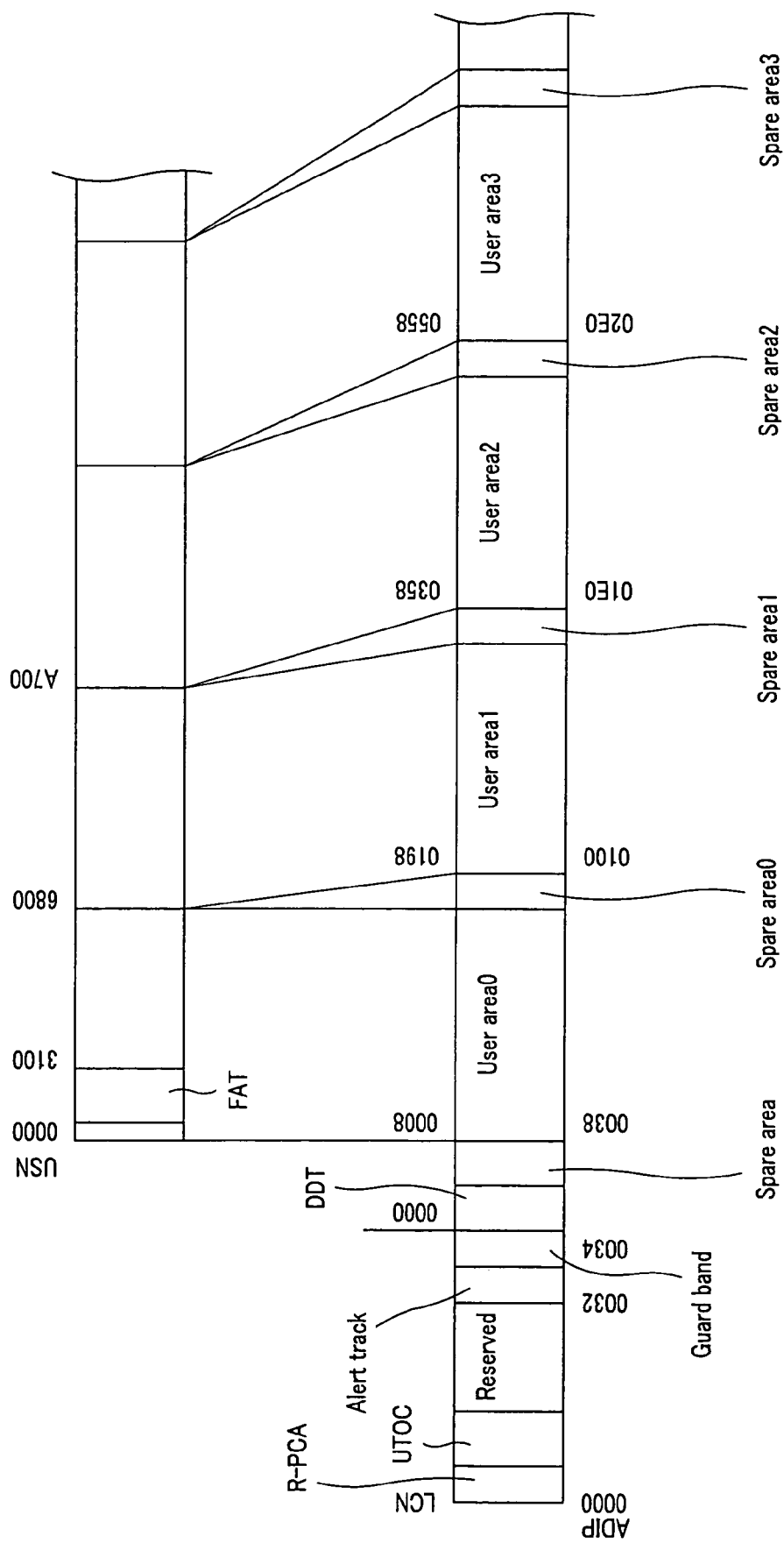
FIG. 9 is a schematic view showing a data managing structure of the next-generation MD 1.
Figure 10:
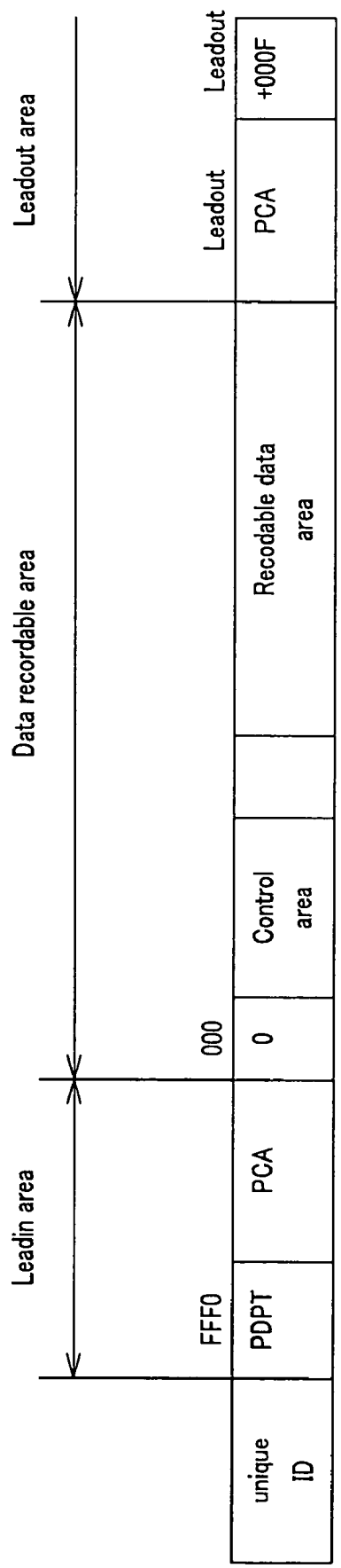
FIG. 10 is a schematic view showing a data managing structure of the next-generation MD 2.

Subsequently, based on FIG. 9 and FIG. 10, the managing structure of a disc of this embodiment will be described. FIG. 9 shows the data managing structure of the next-generation M1, and FIG. 10 shows the data managing structure of the next-generation MD 2.

Since the next-generation MD 1 is the same medium as the conventional minidisc, a PTOC is recorded by emboss pit that is not overwritable as adopted in the conventional minidisc. In this PTOC, the total capacity of the disc, UTOC position in the UTOC area, the position of a power calibration area, the starting position of the data area, the ending position (read-out position) of the data area, etc. are recorded as managing information.

In the next-generation MD 1, in the ADIP addresses 0000 to 0002, the power calibration area (Rec Power Calibration Area) for regulating write output of a laser is provided. In subsequent 0003 to 0005, the UTOC is recorded. The UTOC includes managing information rewritten in response to recording, erasing, etc. of the track (audio track/data track) and manages the respective tracks the starting position, and the ending position, etc., of the parts for constituting the track. Further, in the data area, a free area in which the track is not yet recorded, that is, the parts of the writable area are also managed. In the UTOC, the entire data for the PC is managed as one track not depending upon the MD audio data. Therefore, even if the audio track and the data track are recorded in a mixed manner, the recording position of the data for the PC divided into a plurality of parts can be managed.

Also, the UTOC data is recorded in a specific ADIP cluster in this UTOC area, and the content of the UTOC data is defined at each sector in this ADIP cluster. More particularly, the UTOC sector 0 (a head ADIP sector in this ADIP cluster) manages the parts corresponding to the track or the free area. The UTOC sector 1 and the sector 4 manage character information corresponding to the track. Further, in the UTOC sector 2, the information for managing the recording date corresponding to the track is written.

The UTOC sector 0 is a data area which records recorded data, a recordable unrecording area, and further a data managing information, etc. For example, when data is recorded in the disc, a disc driver searches an unrecording area on the disc from the UTOC sector 0, and records the data here. Also, at a reproducing time, an area in which data track to be reproduced is recorded, is discriminated from the UTOC sector 0, accessed, and a reproducing operation is executed.

Incidentally, in the next-generation MD 1, the PTOC and the UTOC are recorded as data modulated by a technique based on a conventional minidisc system, here an EFM modulation method. Therefore, the next-generation MD 1 has an area recorded as data modulated according to the EFM modulation method, and an area recorded as high density data modulated by an RS-LDC and RLL(1-7)PP modulation technique.

Also, in an alert track described in the ADIP address 0032, information for informing that even if the next-generation MD 1 is inserted into the disc driver of the conventional minidisc, this medium does not correspond to the disc driver of the conventional minidisc is stored. This information may be voice data of "this disc has a format that is not corresponding to this reproducing unit", etc. or alarm sound data. Further, in case of the disc driver having a display unit, the data for displaying the effect may be sufficient. This alert track is recorded by the EFM modulation method so as to be readable even by the disc driver corresponding to the conventional minidisc.

In the ADIP address 0034, a disc description table (DDT) displaying the disc information of the next-generation MD 1 is recorded. In the DDT, a format form, total number of logical clusters in the disc, ID peculiar to the medium, updating information of this DDT, defective cluster information, etc. are described.

From the DDT area, high density data modulated by the RS-LDC and the RLL(1-7)PP modulation method is recorded. Accordingly, a guard band area is provided between the alert track and the DDT.

Also, in the youngest ADIP address in which high density data modulated by the RLL(1-7)PP modulation technique is recorded, that is, the head address of the DDT, a logical cluster number (LCN) being 0000 here is attached. 1 logical cluster is 65,536 bytes, and this logical cluster becomes the reading/writing minimum unit. Incidentally, the ADIP addresses 0006 to 0031 are reserved.

For subsequent ADIP addresses 0036 to 0038, a secure area openable by an authentication is provided. Attribute of opening permissible, non-permissible, etc., of each cluster for constituting data is managed by this secure area. Particularly, in this secure area, information for copyright protection, information for checking data falsification, etc. are recorded. Also, the other various types of closed information can be recorded. This non-permissible area is accessible in a limited manner only by a specific external device permitted particularly. The information for authenticating accessible external device is included.

From the ADIP address 0038, freely writing and reading user area (arbitrary data length) and a spare area (data length 8) are described. The data recorded in the user area are delimited to user sector at 2,048 bytes from the head as one unit when the data recorded in the user area are aligned in an ascending order of the LCN, and a user selector number (USN) being 0000 as a head user selector is attached from an external device, such as a PC, etc., and managed by the FAT file system.

Subsequently, the data managing structure of the next-generation MD 2 will be described by using FIG. 10. The next-generation MD 2 does not have a PTOC area. Therefore, disc managing information, such as total capacity of the disc, the position of a power calibration area, the starting position of the data area, the ending position (lead-out position) of the data area, etc. is all included in the ADIP information as PDPT (Preformat Disc Parameter Table), and recorded. The data are modulated by the RS-LDC with BIS and RLL(1-7)PP modulation method, and recorded by the DWDD technique.

Also, in a lead-in area and a lead-out area, a laser power calibration area (Power Calibration Area: PCA) is provided.

In the next-generation MD2, an ADIP address continued to the PCA is set to 0000, and the LDC is attached.

Also, in the next-generation MD 2, a control area corresponding to the UTOC area in the next-generation MD 1 is prepared. In FIG. 10, information for copyright protection, information for checking data falsification, and unique ID area (Unique ID:UID) for recording other closed information, etc. are shown. In fact, this UID area is recorded at further inner peripheral position of the lead-in area by a recording system different from the normal DWDD technique.

The files of the next-generation MD 1 and the next-generation MD 2 are managed together based on the FAT file system. For example, the respective data tracks have the FAT file systems independently. Alternatively, one FAT file system can be recoded over a plurality of the data tracks.

Figure 11:
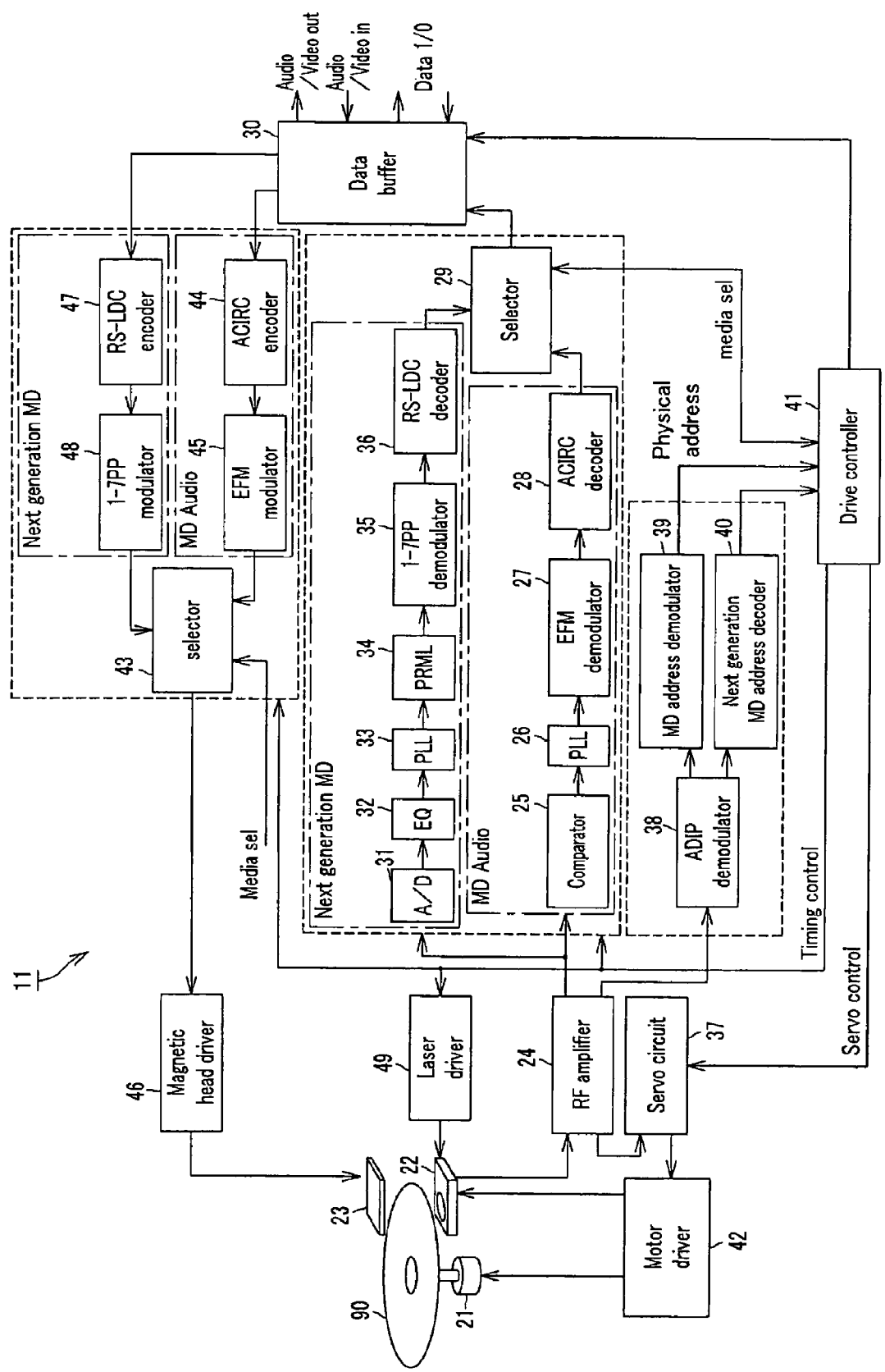
FIG. 11 is a block diagram showing a media drive of the data recording/reproducing apparatus.

Subsequently, the peripheral structures of the media drive 11 and the audio processor 19 in the data recording/reproducing apparatus 1 will be described in detail by using FIG. 11.

The media drive 11 has a structure for executing EFM modulation/ACIRC encoding for recording a conventional minidisc as a recording processing system particularly for recording/reproducing the minidisc 90, and a structure for executing RLL(1-7)PP modulation/RS-LDC encoding for recording a conventional minidisc. Also, as a reproducing process system, the media drive 11 has a structure for executing EFM demodulation/ACIRC decoding for reproducing a conventional minidisc, and a structure for executing an RLL(1-7)PP demodulation/RS-LDC decoding based on data detection using PR(1, 2, 1)ML and Viterbi decoding for reproducing the next-generation minidisc.

The media drive 11 rotatably drives the charged minidisc 90 by a spindle motor 21 through a CLV system or a ZCAV system. At the recording/reproducing time, a laser beam is illuminated from an optical head 22 to this minidisc 90.

The optical head 22 outputs a high level laser for heating the recording track to a Curie temperature at the recording time, and outputs a relatively low level laser for detecting data from the reflected light by a magnetic Kerr effect at the reproducing time. Therefore, the optical head 22 carries a laser diode as a laser output means, an optical system having a polarization beam splitter, an objective lens, etc., and a detector for detecting a reflected light. The optical lens in the optical head 22 is, for example, held displaceably in the radial direction of the disc and a direction for contacting with and separating from the disc by a biaxial mechanism.

In this embodiment, to obtain reproducing characteristics of the maximum limit to the conventional minidisc and the next-generation minidisc having different physical specifications on the surface of a medium, a phase compensating plate which can optimize a bit error rate at the data reading time for both the discs is provided in the reading light optical path of the optical head 2.

The magnetic head 23 is disposed at the position opposed to the optical head 22 through the minidisc 90. The magnetic head 23 applies a magnetic field modulated by recording data to the minidisc 90. Also, though not shown, a thread motor and a thread mechanism for moving the entire optical head 22 and the magnetic head 23 in a disc radial direction are provided.

In this media drive 11, in addition to a recording/reproducing head system by the optical head 22 and the magnetic head 23, and a disc rotary driving system by the spindle motor 21, a recording processing system, a reproducing processing system, a servo system, etc., are provided. As the recording processing system, a portion for executing EFM modulation, ACIRC encoding at the recording time to the conventional minidisc and a portion for executing RLL(1-7)PP modulation, RS-LDC encoding at the recording time to the next-generation MD 1 and the next-generation MD2 are provided.

As the reproducing processing system, a portion for executing demodulation and ACIRC decoding to the EFM modulation at the reproducing time of the conventional minidisc and a portion for executing demodulation (PR(1, 2, 1) ML and RLL(1-7) demodulation based on the data detection using the Viterbi decoding), RS-LDC decoding corresponding to the RLL(1-7)PP modulation at the reproducing time of the next-generation MD 1 and the next-generation MD 1 are provided.

Information (photocurrent obtained by detecting a laser reflected beam by a photodetector) detected as the reflected light by laser radiating to the minidisc 90 of the optical head 22 is supplied to an RF amplifier 24. The RF amplifier 24 executes current-voltage conversion, amplification, matrix calculation, etc. of the inputted detection information, and extracts a reproducing RF signal, a tracing error signal TE, a focus error signal FE, groove information (ADIP information recorded by wobbling of the track in the minidisc 90), etc., as reproducing information.

Heretofore, at the minidisc reproducing time, a reproducing RF signal obtained by the RF amplifier is processed by an EFM demodulator 27 and an ACIRC decoder 28 through a comparator 25 and a PLL circuit 26. The reproduced RF signal is binarized by the EFM demodulator 27 to an EFM signal train, then EFM demodulated, and further error correction and deinterleaving processes are executed by the ACIRC decoder 28. If the reproduced RF signal is audio data, the signal becomes a state of ATRAC compressed data at this time point. At this time, a selector 29 is selected at the conventional minidisc signal side, and the demodulated ATRAC compressed data is output as reproduced data from the minidisc 90 to a data buffer 30. In this case, the compressed data is supplied to the audio processor 19 of FIG. 5.

On the other hand, at the next-generation MD 1 and the next-generation MD 2 reproducing time, the reproduced RF signal obtained by the RF amplifier is signal processed by an RLL(1-7)PP demodulator 35 and an RS-LDC decoder 36 through an A/D converter circuit 31, an equalizer 32, a PLL circuit 33 and a PRML circuit 34. The reproduced RF signal is processed to the reproduced data as an RLL(1-7) code string by the data detection using the PR(1, 2, 1) ML and the Viterbi decoding in the RLL(1-7)PP demodulator 35, and this RLL(1-7) code string is subjected to the RLL(1-7) demodulating process. Further, the RLL(1-7) code string is subjected to error correction and deinterleaving process by an RS-LDC decoder 36. In this case, the selector 29 is selected at the next-generation MD 1/the next-generation MD 2 side, and the demodulated data is output as the reproduced data from the minidisc 90 to the data buffer 30. At this time, the demodulated data is supplied to the memory transfer controller 12 of FIG. 5.

A tracking error signal TE and focus error signal FE to be output from the RF amplifier 24 are supplied to a servo circuit 37, and the groove information is supplied to an ADIP decoder 38.

The ADIP decoder 38 extracts a wobble component by band limiting the groove information by a band-pass filter, performs FM demodulation, by-phase demodulation to extract an ADIP address. The extracted ADIP address that is absolute address information on the disc is supplied to the drive controller 41 through the MD address decoder 39 in the case of the conventional minidisc and the next-generation MD 1 or through the next-generation MD 2 address decoder 40 in the case of the next-generation MD 2.

In the drive controller 41, a predetermined control process is executed based on each ADIP address. Also, the groove information is returned to the servo circuit 37 for spindle servo control.

The servo circuit 37 generates a spindle error signal for the CLV servo control and the ZCAV servo control based on an error signal obtained by integrating the phase error between the groove information and the reproducing clock (PLL system clock at the decoding time).

Also, the servo circuit 37 generates various types of servo control signals (a tracking control signal, a focus control signal, a thread control signal, a spindle control signal, etc.) based on a spindle error signal, a tracking error signal supplied from the RF amplifier 24 as described above, a focus error signal or a tracking jump command, an access command signal, etc. from the drive controller 41, and outputs to a motor driver 42. That is, necessary processes, such as a phase compensating process, a gain process, a target value setting process, etc. are executed to the above-mentioned servo error signal or command, and the various types of servo control signals are generated.

The motor driver 42 generates a predetermined servo drive signal based on the servo control signal supplied from the servo circuit 37. The servo drive signals here are a biaxial drive signal (two types of a focus direction and a tracking direction) for driving a biaxial actuator, a thread motor drive signal for driving a thread mechanism, and a spindle motor drive signal for driving the spindle motor 21. The focus control, tracking control to the minidisc 90, and CLV control or ZCAV control to the spindle motor 21 are executed by such a servo drive signal.

When a recording operation is executed to the minidisc 90, high density data from a memory transfer controller 12 shown in FIG. 5 or a normal ATRAC compressed data from the audio processor 19 is supplied.

Heretofore, at the recording time to the conventional minidisc, a selector 43 is connected to the conventional minidisc side, and an ACIRC encoder 44 and an EFM modulator 43 function. In this case, as the audio signal, the compressed data from the audio processor 19 is interleaved by the ACIRC encoder 44, added with the error correction code, and then EFM modulated in the EFM modulator 45. The EFM modulation data is supplied to the magnetic head driver 46 through the selector 43, a magnetic field is applied by the magnetic head 23 to the minidisc 90 based on the EFM modulation data, and thereby the modulated data is recorded.

At the next-generation MD 1 and the next-generation MD 2 recording time, the selector 43 is connected to the next-generation MD 1/the next-generation MD 2 side, and the RS-LCD encoder 47 and the RLL(1-7)PP modulator 48 function. In this case, the high density data sent from the memory transfer controller 12 is interleaved by the RS-LCD encoder 47, the error correction code of the RS-LDC technique is added, and then RLL(107) modulated by the RLL (1-7) PP modulator 48.

The recorded data modulated to the RLL(1-7) code string is supplied to a magnetic head driver 46 through the selector 43, a magnetic field is applied by the magnetic head 23 to the minidisc 90 based on the modulated data and thereby the data is recorded.

A laser driver/APC 49 executes a laser emitting operation in a laser diode at the above-mentioned reproducing time and recording time, and so-called APC (Automatic Laser Power Control) operation is executed. More particularly, though not shown, a detector for monitoring a laser power is provided in the optical head 22, and this monitor signal is fed back to the driver/APC 49. The laser driver/APC 49 compares the present laser power obtained as the monitor signal with a preset laser power to reflect its error part to a laser drive signal, thereby controlling so that the laser power output from the laser diode is stabilized at a set value. Here, the laser power is set at the values as a reproduced laser power and a recorded laser power in the register in the laser driver/APC 49 by the drive controller 41.

The drive controller 41 controls the respective structures to execute the above-mentioned respective operations (the respective operations of accessing, various type servo, data writing, data reading) based on the instruction from the system controller 18. Incidentally, in FIG. 11, the respective parts surrounded by one dotted broken line can be constructed as one-chip circuit.

Incidentally, if the minidisc 90 is set in areas by previously dividing into a data track recording area and an audio track recording area, the system controller 18 instructs accessing to the drive controller 41 of the media drive 11 based on the set recording area in response to whether the data to be recorded/reproduced is the audio track or the data track. Also, the system controller 18 allows to record only one of the data for the PC and the audio data and can control to inhibit recording of the data except this to the attached minidisc 90. That is, the data for the PC and the audio data can be controlled so as not to be mixed.

An example of a managing system when the content data is recorded/reproduced by the data recording/reproducing apparatus 1 to the minidisc 90 having the above-mentioned specification will be described.

Figure 12:
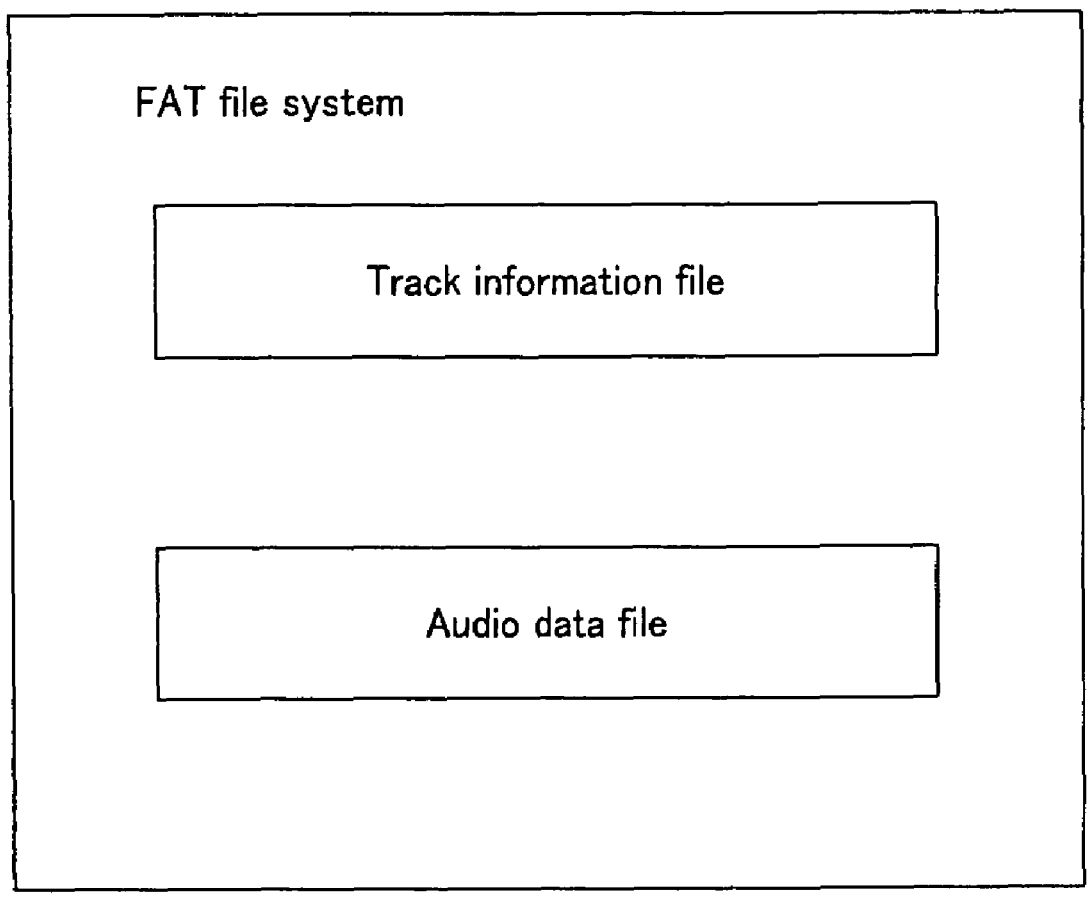
FIG. 12 is a view showing an example of a managing system of audio data.

FIG. 12 shows an example of a managing technique of audio data. As shown in FIG. 12, a track information file and an audio data file are generated on the disc. The track information file and the audio data file are files managed by the FAT system. The track information file corresponds to encryption information relating to the content data. Incidentally, the managing structure shown in FIG. 12 includes a file of security information and content generation managing information characteristic in the next-generation MD 1 and the next-generation MD 2. As the security information and the content generation managing information, there are an EKB (Enabling Key Block) as reproduction allowing information of each set of the recording/reproducing apparatus of the recording medium, a track MAC, etc. as falsification checking information of the content.

Figure 13:
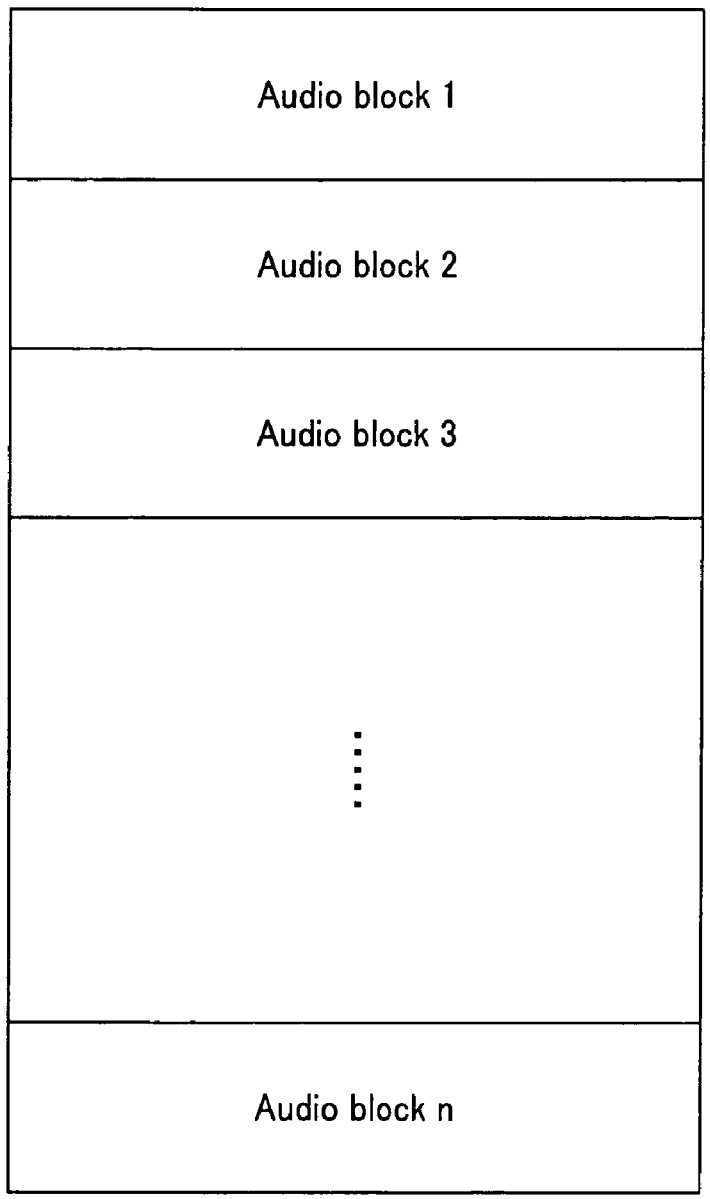
FIG. 13 is a view showing an audio file by an example of a managing system of audio data.

The audio data file contains, as shown in FIG. 13, a plurality of musical data as one file. When the audio data file is seen in the FAT system, the file is seen as a huge file. A plurality of audio blocks included in the audio data file form one track. The audio data file is delimited therein as parts, and the audio data is handled as a set of the parts. The delimiter of this parts does not always coincide with that of the tracks.

Figure 14:
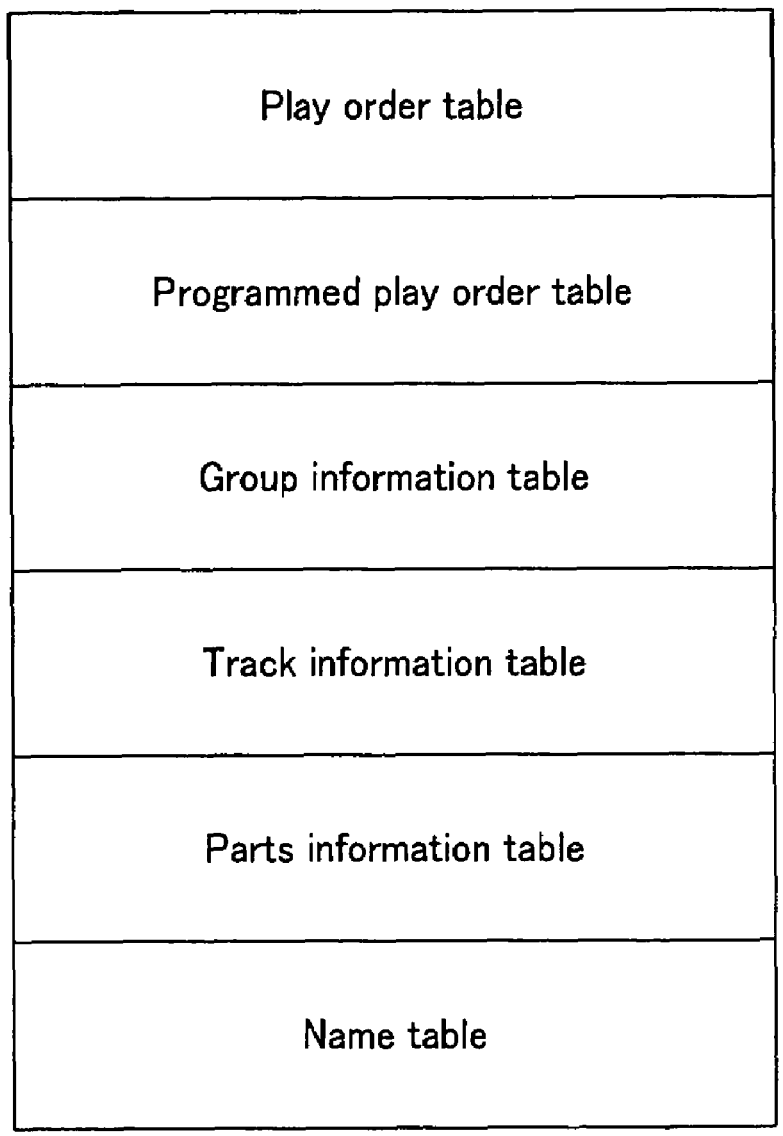
FIG. 14 is a view showing a track information file by an example of a managing system of audio data.

The track information file shown in FIG. 12 is the file which describes various type information for managing the musical data contained in the audio data file. The track information file includes, as shown in FIG. 14, a play order table, a programmed play order table, a group information table, a track information table, a parts information table, and a name table.

Figure 15:
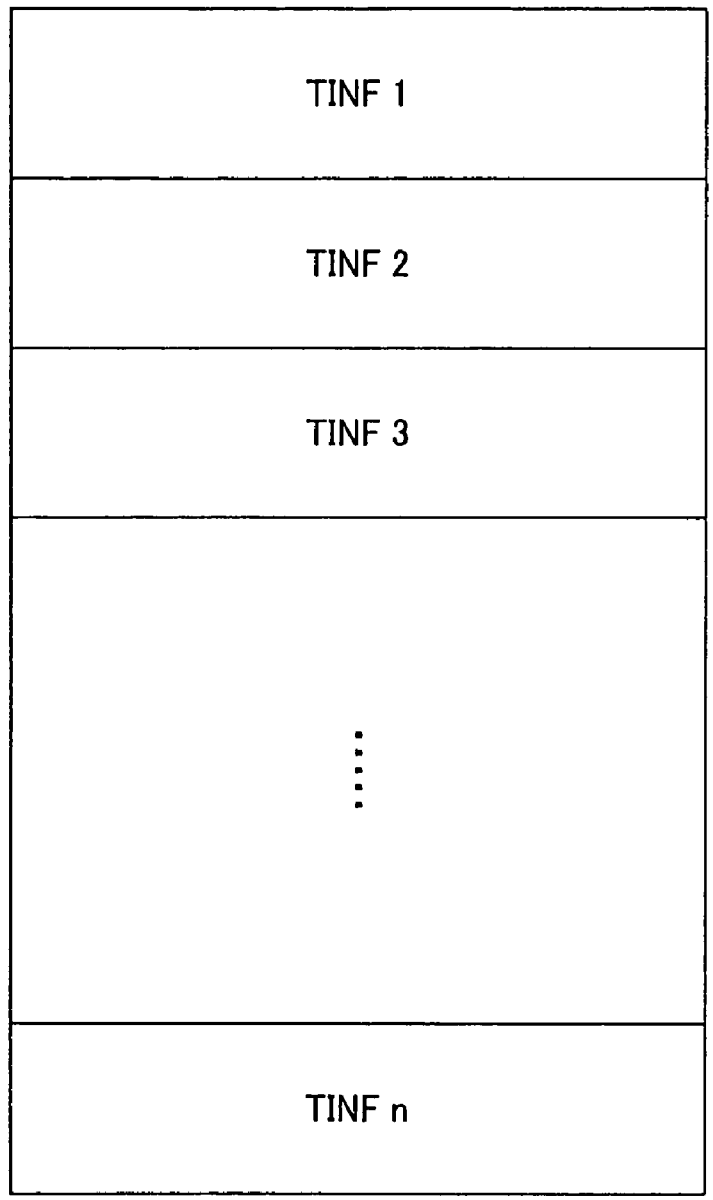
FIG. 15 is a view showing a play order table by an example of a managing system of audio data.

The play order table is a table showing a reproducing order defined by a default. The play order table contains information INF1, INF2, . . . , showing a link head to the track descriptor (FIG. 19) of the track information table about the respective truck numbers (musical number), as shown in FIG. 15. The track number is, for example, continued numbers starting from "1".

Figure 16:
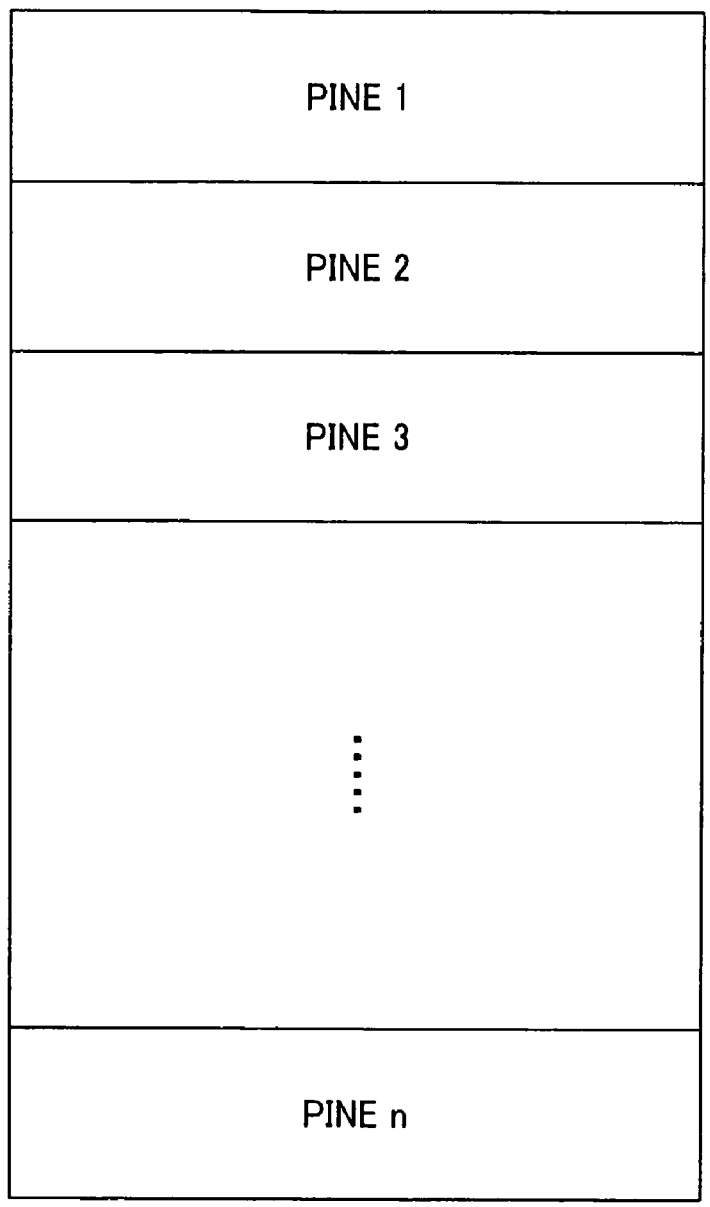
FIG. 16 is a view showing a programmed play order table by an example of a managing system of audio data.
Figure 17:
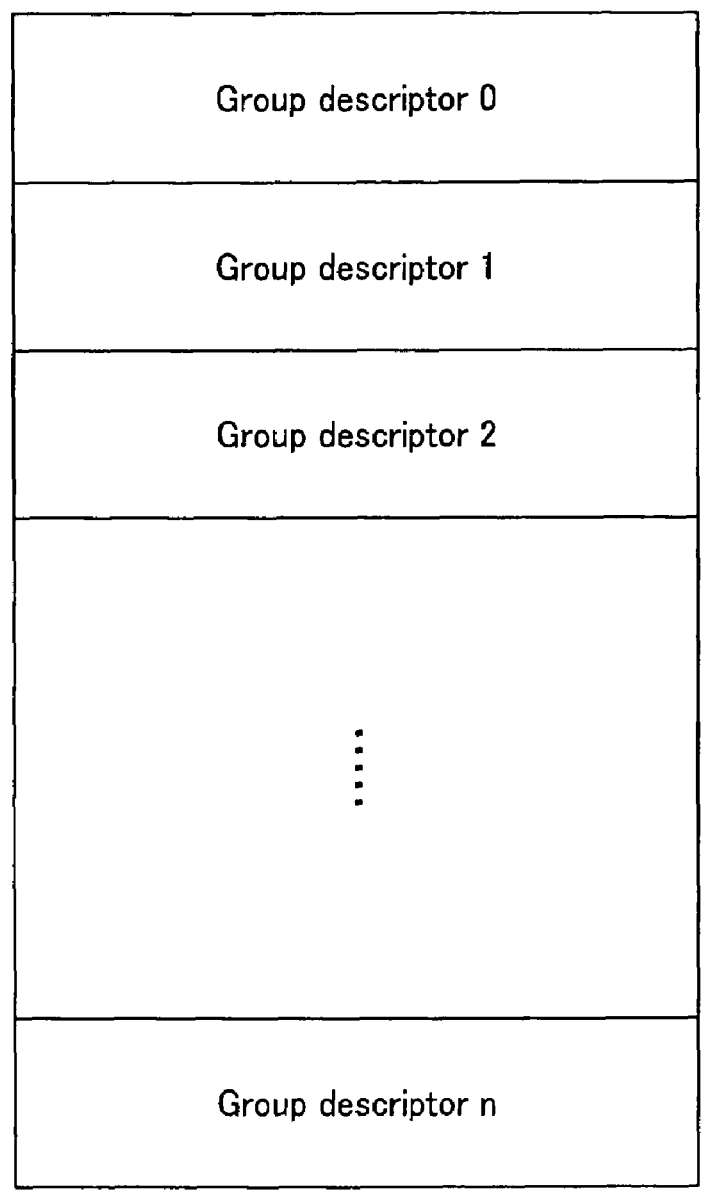
FIG. 17 is a view showing a group information table by an example of a managing system of audio data.
Figure 18:
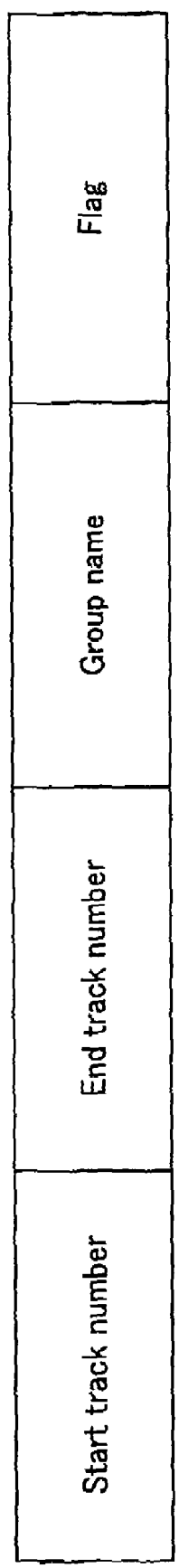
FIG. 18 is a view showing a group information table by an example of a managing system of audio data.

The programmed play order table is a table in which a reproducing order is defined by each user. In the programmed play order table, as shown in FIG. 16, information track information PINF1, PINF2, . . . , of a link head to the track descriptor about the respective track numbers are described. In the group information table, as shown in FIGS. 17 and 18, information on a group is described. The group is a set of one or more tracks having continued track numbers or a set of one or more tracks having the continued programmed track numbers. The group information table, as shown in FIG. 17, is described by the group descriptors of the respective groups. In the group descriptors, as shown in FIG. 17, the track numbers from which the group is started, the number of the ending track, the group name, and a flag are described.

Figure 19:
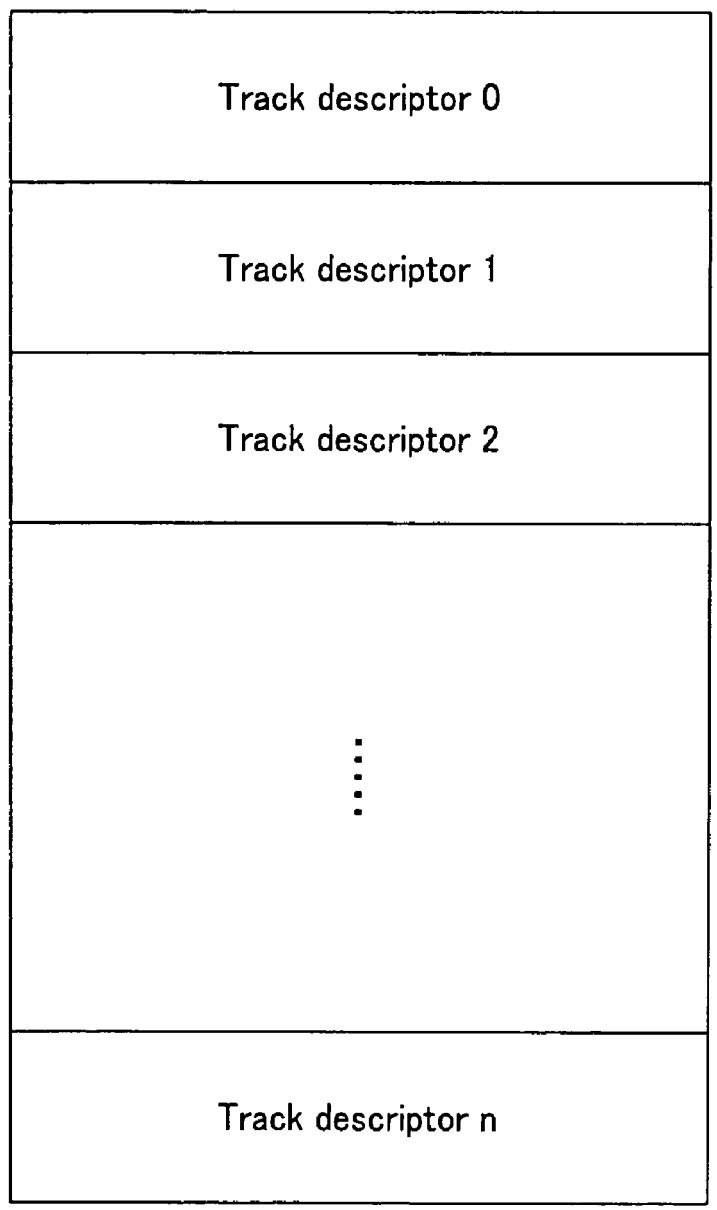
FIG. 19 is a view showing a track information table by an example of a managing system of audio data.

In the track information table, as shown in FIG. 19 and FIG. 20, information relating to each song is described. The track information table includes, as shown in FIG. 19, the track descriptors of the respective tracks (the respective songs). In the respective track descriptors, as shown in FIG. 20, a coding system, copyright managing information, decoding key information of the contents, pointer information to parts number as an entry starting the musical song, an artist name, a title name, original song order information, recording time information, etc., are described. The artist name, the title name are not the names themselves, but the pointer information to the name table are described. In the coding system, a CODEC system is shown, and becomes decoding information.

Figure 21:
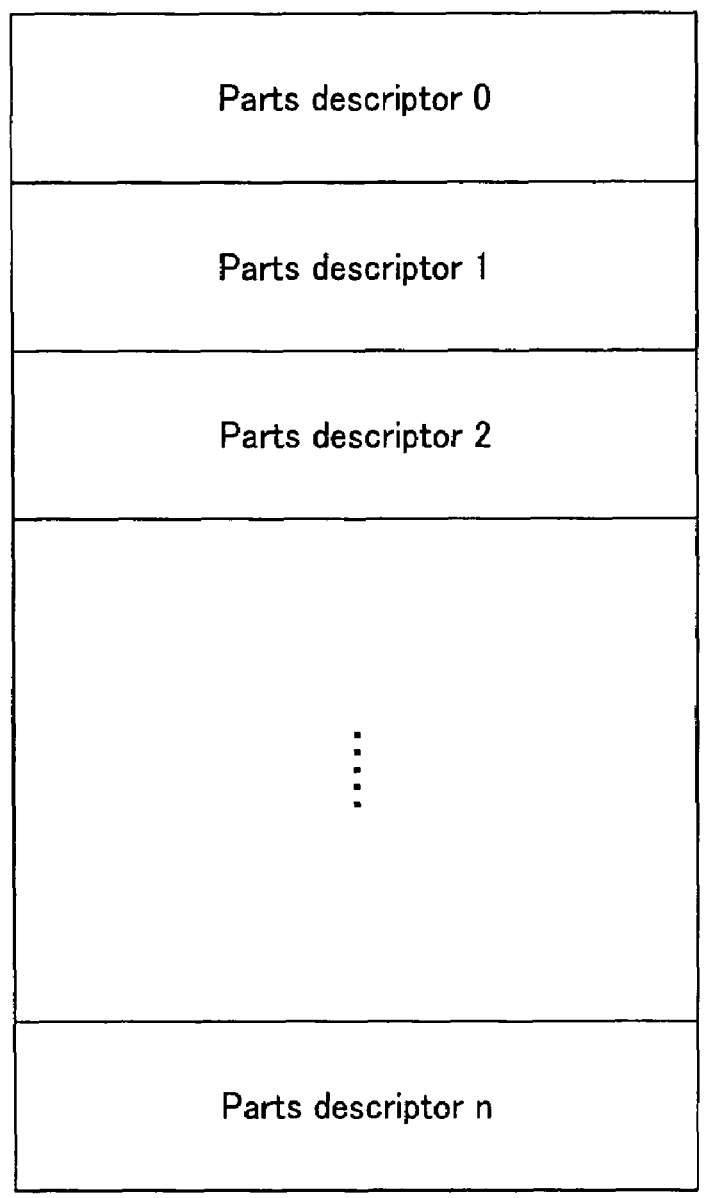
FIG. 21 is a view showing a parts information by an example of a managing system of audio data.
Figure 22:
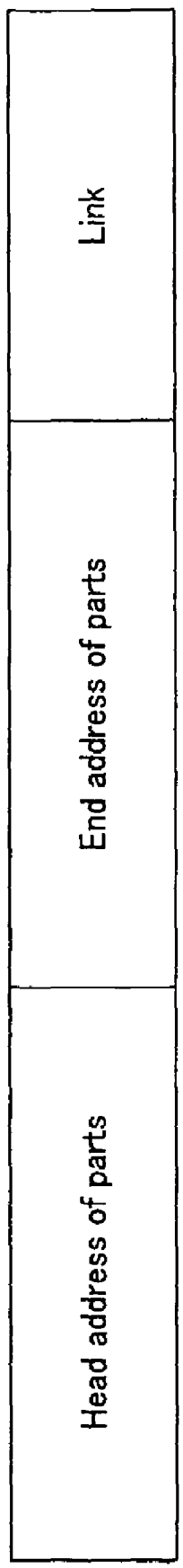
FIG. 22 is a view showing a parts information by an example of a managing system of audio data.

The parts information table, as shown in FIG. 21 and FIG. 22, a pointer for accessing the position of the actual musical song from the parts number is described. The parts information table includes, as shown in FIG. 21, the parts descriptors of the respective parts. The parts are the respective parts divided from the entirety of one track (musical song) or one track. The entry of the parts descriptor is pointed out by the track information table (FIG. 20). In the respective parts descriptors, as shown in FIG. 22, the address of the head of the part on the audio data file, the address of the end of the part, and a link head to the part continued to the part are described.

Incidentally, as the addresses used as pointer information of the part number, pointer information of the name table, and pointer information showing the position of the audio file, a byte offset of the file, cluster number of the FAT, physical address of the disc used as a recording medium, etc., can be used.

Figure 23:
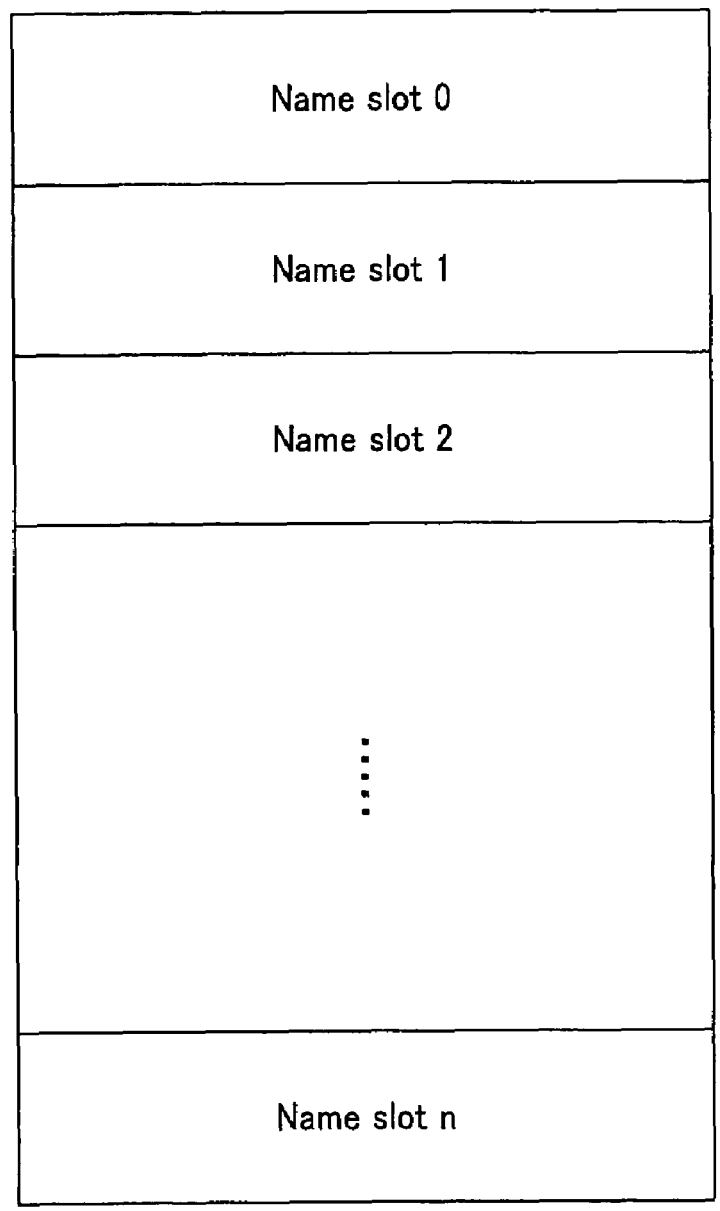
FIG. 23 is a view showing a name table by an example of a managing system of audio data.
Figure 24:
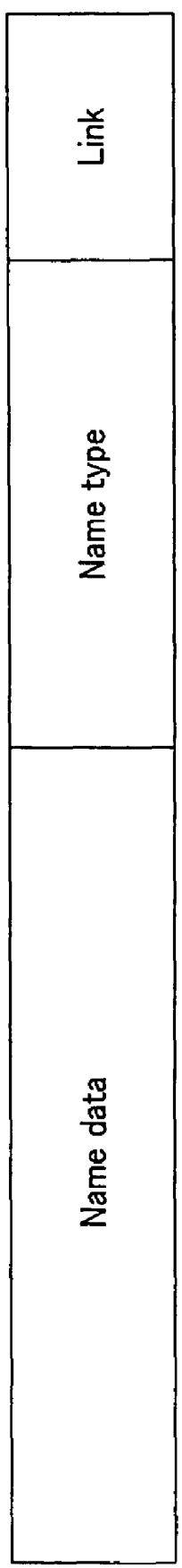
FIG. 24 is a view showing a name table by an example of a managing system of audio data.

The name table is a table for displaying a character as the entity of the name. The name table includes a plurality of name slots, as shown in FIG. 23. The respective name slots are linked from the respective pointers showing the names, and called. The pointers for calling the names include the artist name of the track information table, the title name, the group name of the track information table, etc. Also, the respective name slots can be called from plural ones. The respective name slots include, as shown in FIG. 24, name data of character information, a name type of the attribute of this character information, and a link destination. A long name which cannot be contained in one name slot is divided into a plurality of name slots, and can be described. If the name is not contained in one name slot, the link head to the name slot describing the name continued to the name slot is described.

Figure 25:
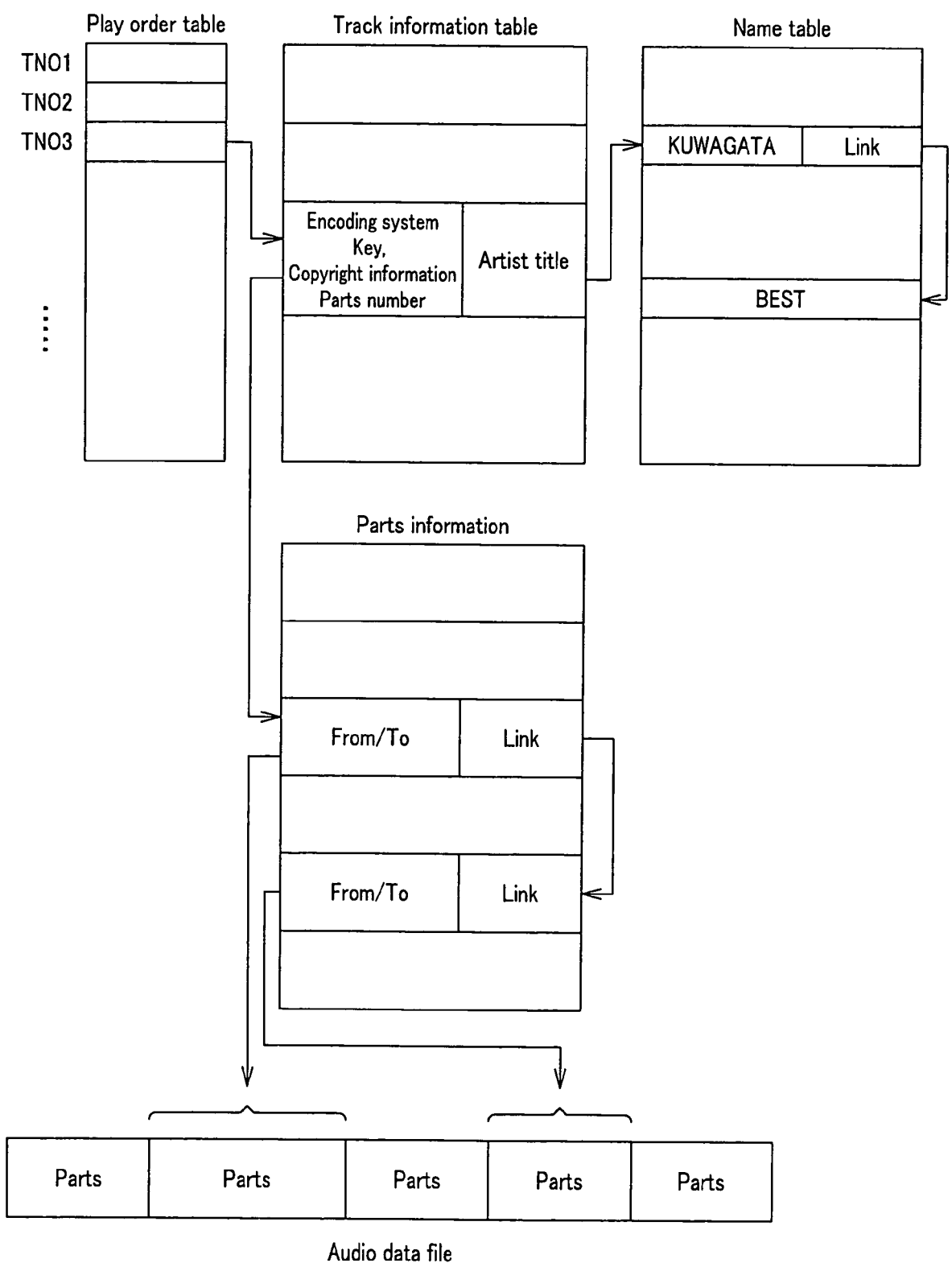
FIG. 25 is a view showing an example of a managing system of audio data.

In one example of the managing system of the audio data in the system to which the present invention is applied, as shown in FIG. 25, when the reproduced track number is designated by the play order table (Refer to FIG. 15), the track descriptor (FIG. 19) of the link destination of the track information table is read, the coding system, copyright managing information, decoding key information of the content, the pointer information to the parts number starting its musical song, the pointers of the artist name and the title name, the original song order information, recording time information, etc. are read from this track descriptor.

The information of the parts number read from the track information table is linked to the parts information table (Refer to FIG. 21 and FIG. 22), and the audio data file of the position of the parts corresponding to the starting position of the track (musical song) is accessed from this parts information table. When the data of the parts of the position designated by the parts information table of the audio data file is accessed, the reproducing of the audio data is started from its position. At this time, the decoding is executed based on the coding system read from the track descriptor of the track information table. When the audio data is encrypted, the key information read from the track descriptor is used.

If there are the parts continued to the parts, the parts descriptor is described at the link head of the parts, the parts descriptors are sequentially read according to this link destination. The audio data of the desired track (musical song) can be reproduced by tracing the link destination of this parts descriptor, reproducing the audio data of the parts disposed at the position designated by its parts descriptor on the audio data file. Also, the name slot (Refer to FIG. 23 and FIG. 24) of the name table disposed at the position pointed out by the pointer of the artist name or the title name read from the track information table is called, and the name data is read from the name slot disposed at the position.

Figure 26:
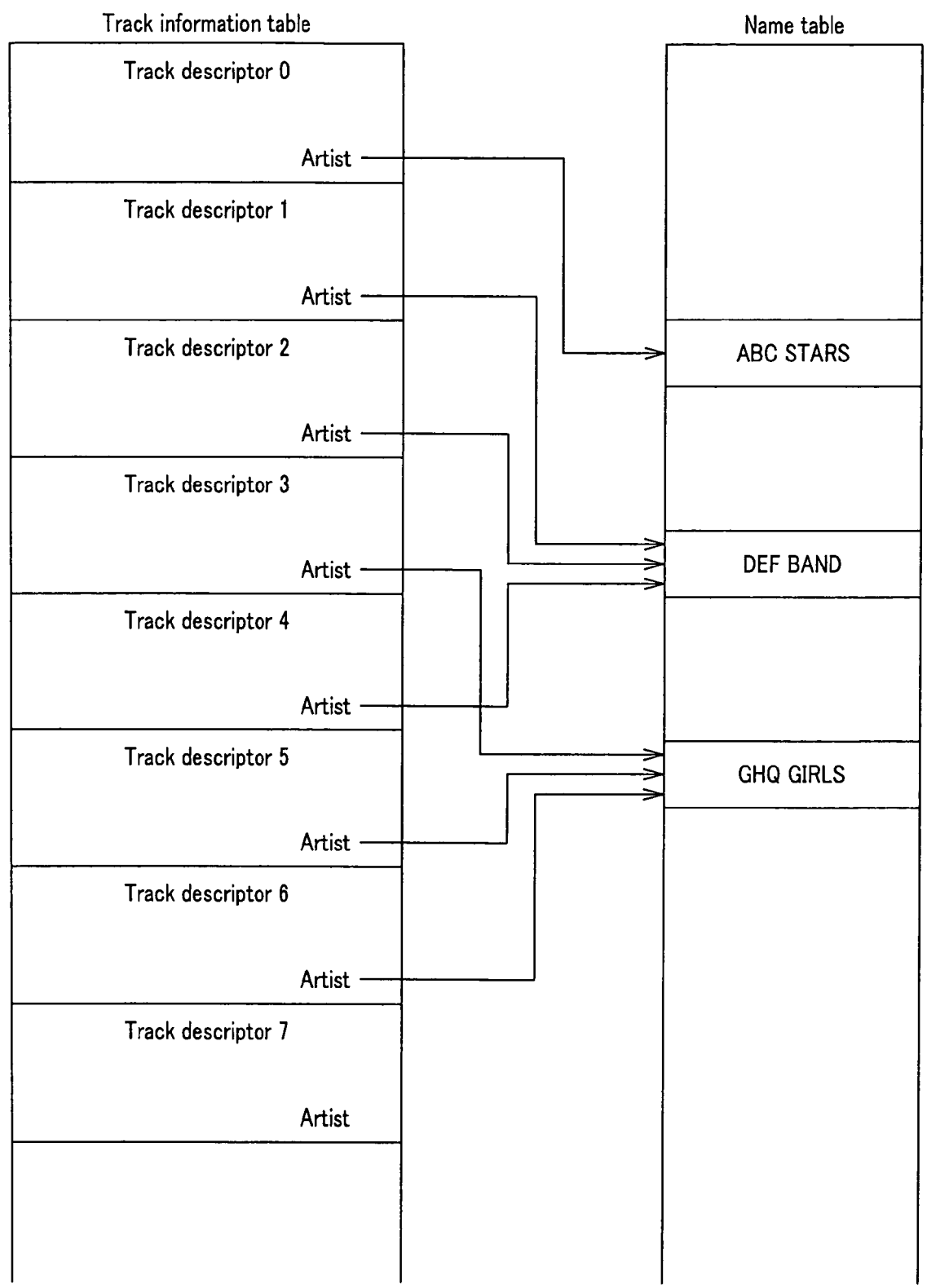

Incidentally, as described above, a plurality of the name slots of the name table can be referred. For example, there might be the case that a plurality of the musical songs of the same artist are recorded. In this case, as shown in FIG. 26, the same name table is referred as the artist name from a plurality of the track information tables. In the example of FIG. 26, a track descriptor "1", a track descriptor "2", and a track descriptor "4" are all musical songs of the same artist "DEF BAND", and the same name slot is referred as the artist name. Also, a track descriptor "3", a track descriptor "5", and a track descriptor "6" are all musical songs of the artist "GHQ GIRLS" of the same position, and the same name slot is referred to as the artist name. Thus, when the name slots of the name table can be referred from a plurality of the pointers, the capacity of the name table can be saved.

Together with this, for example, the link of this name table can be utilized to display the information of the same artist name. For example, if a list of the musical songs of "DEF BAND" of the artist name is desired to be displayed, the track descriptor which refers to the address of the name slot of "DEF BAND" is traced. In this example, pieces of the information of the track descriptor "1", the track descriptor "2" and the track descriptor "4" are obtained by tracing the track descriptors which refer to the address of the name slot of "DEF BAND". Thus, a list of the musical songs of "DEF BAND" of the artist name in the musical songs contained in this disc can be displayed. Incidentally, since a plurality of the name tables can be referred, there is not provided a link for reversely tracing the track information table from the name table.

When audio data is newly recorded, desired number of recording blocks or more, for example, continued unused areas of 4 recording blocks or more are prepared by the FAT table. It is because no waste exists in accessing to record the audio data in the continued area as much as possible in case of securing the continued area of the desired number of recording blocks or more.

When the area for recording the audio data is prepared, one new track description is assigned on the track information table, and a key of content for encrypting this audio data is generated. Further, the input audio data is encrypted, and the encrypted audio data is recorded on the prepared unused area. The area which records this audio data is coupled to the last of the audio data file in the FAT file system.

As the new audio data is coupled to the audio data file, the information of this coupled position is formed, and the position information of the newly formed audio data is recorded in the newly secured parts description. Further, the key information and the parts number are described in the newly secured track description. Further, the artist name, the title name, etc. are described in the name slots as needed, and pointers linked to the artist name and the title name are described in the name slots in the track description. The number of the track description is registered in the play order table. Also, copyright managing information is updated.

When the audio data is reproduced, the information corresponding to the designated track number is obtained from the play order table, and the track descriptor of the track to be reproduced is obtained.

The key information is acquired from the track descriptor of the track information table, and a parts description showing an area stored in the data of an entry is obtained. The position on the head audio data file of the parts which stores the desired audio data is acquired from its parts description, and the data stored at its position is retrieved. Further, an encryption is decrypted by using the acquired key information to the data reproduced from the position, and the audio data is reproduced. If the parts description has a link, the data is designated and linked to the parts, and the same procedure is repeated.

When the musical song becoming a track number "n" is changed to a track number "n+m" on the play order table, the track description Dn in which the information of the track is described from the track information TINFn in the play order table is obtained. The values of the track information TINFn+m from TINFn+1 (track description number) are all moved to immediately before. The number of the track description Dn is stored in the track information TINFn+m.

When the musical song being the track number "n" is deleted in the play order table, the track descriptor Dn describing the information of the track is acquired from the track information TINFn in the play order table. The effective track descriptors Dn after the track information TINFn+1 in the play order table are all moved to immediately before. An encoding system corresponding to the track, decoding key are obtained by the track information table from the obtained track descriptor Dn, and the number of the parts descriptor Pn showing the area for storing the head musical data is obtained. The audio block of the range designated by the parts descriptor Pn is separated from the audio data file on the FAT file system. Further, the track descriptor Dn of the track of the track information table is erased.

Figure 27:
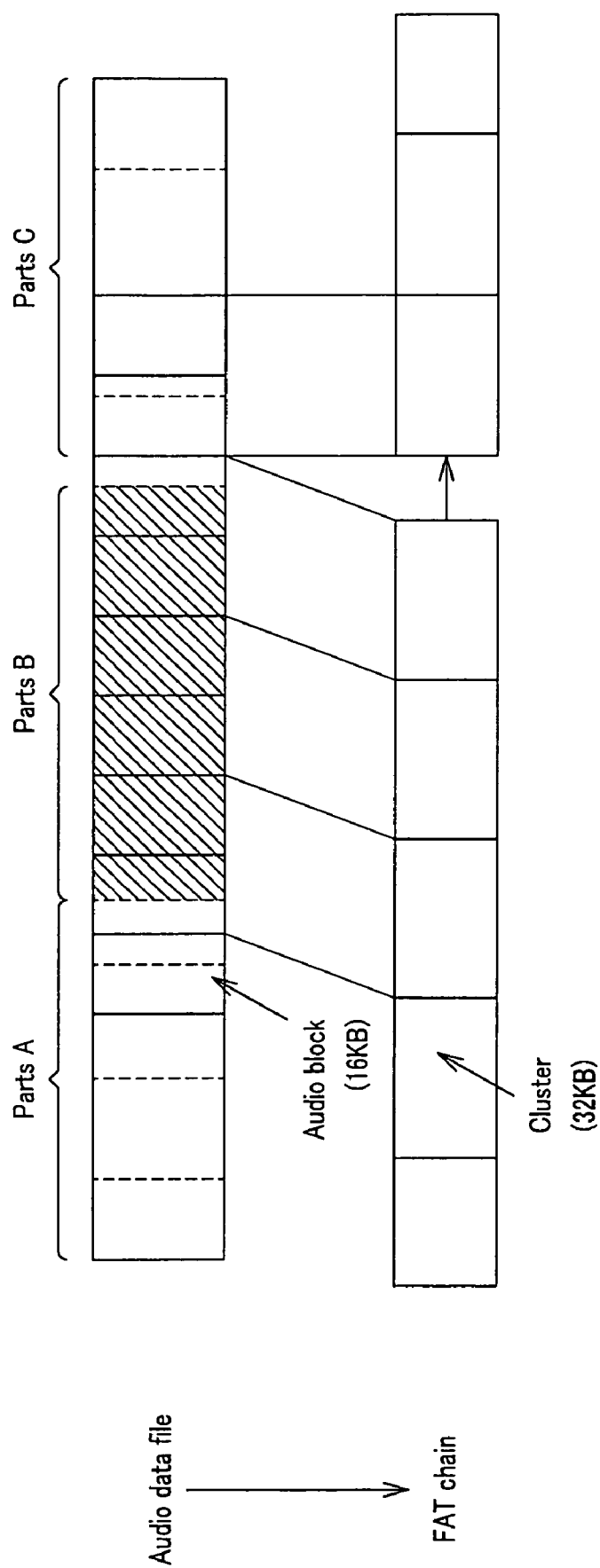
FIG. 27 is a view showing a process for deleting parts from an audio data file in one example of a managing system of audio data.

For example, in FIG. 27, the parts A, the parts B and the parts C are coupled so far, and the parts B of them is deleted. The parts A and the parts B are shared in the same audio block (and the same FAT cluster), and the FAT chain is continued. The parts C is positioned immediately after the parts B in the audio data file, but when the FAT table is examined, the parts C are actually at the position separated from the parts B.

Figure 28:
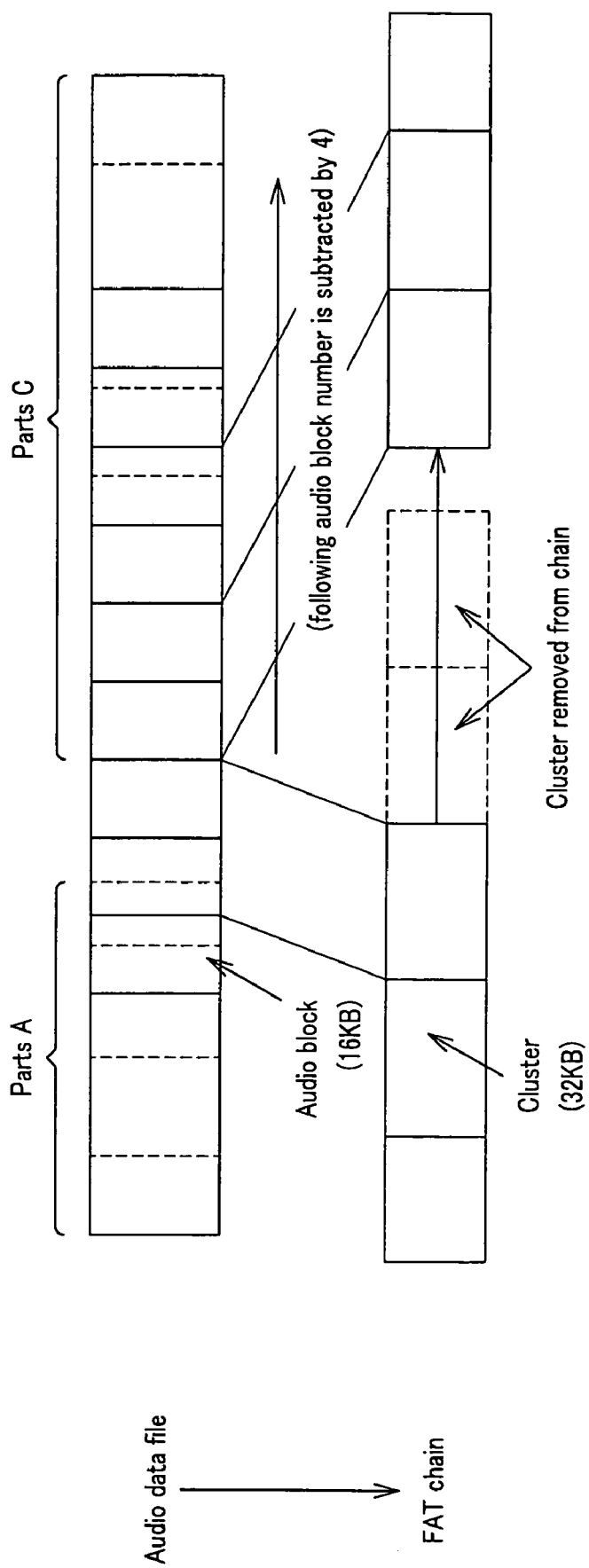
FIG. 28 is a view showing a process for deleting parts from audio data file in one example of a managing system of audio data.

In the case of this example, as shown in FIG. 28, when the parts B are deleted, two FAT clusters which does not share the present parts and the cluster can be actually removed (returned to an empty area) from the FAT chain. That is, the audio data file is shortened to 4 audio blocks. The numbers of the audio blocks recorded in the parts C and the parts after the parts C are all reduced by 4 in association with this.

The deletion can be executed not for one track entirely, but can be executed for the part of its track. If the part of the track is deleted, the information of the residual track can be decoded by using the coding system, decoding key corresponding to the track obtained from the parts descriptor Pn by the track information table.

When the track n and the track (n+1) on the play order table are coupled, the track descriptor number Dn describing the information of the track is obtained from the track information TINFn in the play order table. Further, the track descriptor number Dm describing the information of the track is obtained from the track information TINFn+1 in the play order table. The values of the effective TINF (the track descriptor number) after the TINFn+1 in the play order table are all moved to TINF immediately before. The programmed play order table is retrieved, and the tracks which refer the track descriptor Dm are all deleted. A new encrypting key is generated, the list of the parts descriptors is retrieved from the track descriptor Dn, and the list of the parts descriptors retrieved from the track descriptor Dm is coupled to the last of the list of the parts descriptor.

When the tracks are coupled, both the track descriptors are compared, no problem in the copyright management is confirmed, and the parts descriptor is obtained from the track descriptor. Then, whether the stipulation regarding the fragment is satisfied or not when both the tracks are coupled, must be confirmed in the FAT table. Further, it is necessary to update the pointer to the name table as required.

When the track n is divided into the track n and the track (n+1), the track descriptor number Dn describing the information of the track is obtained from the TINFn in the play order table. The track descriptor number Dm describing the information of the track is obtained from the track information TINFn+1 in the play order table. The values of the effective track information TINF (track descriptor number) after the TINFn+1 in the play order table are all moved to TINF immediately after. A new key is generated for the track descriptor Dn. The list of the parts descriptors is retrieved from the track descriptor Dn. The new parts descriptor is assigned, and the contents of the parts descriptor before dividing are copied here. The included parts descriptor of a dividing point are shortened to immediately before the dividing point. The link of the parts descriptor after the dividing point is cut off. The new parts descriptors are set immediately after the dividing point.

The present invention is not limited to the above-mentioned embodiments which have been described with reference to the accompanying drawings, and various modifications, replacements or the equivalents may be made by those skilled in the art without departing from the spirit or scope of the general inventive concept as defined by the appended claims and their equivalence.

INDUSTRIAL APPLICABILITY

The present invention is used for an apparatus which can record in a large capacity and which can handle a recording medium having a file format including managing data complicated by encrypting recording, etc.

The invention claimed is:

1. A file management apparatus for managing a file of content data recorded on a recording medium based on a file system capable of at least dividing, combining, erasing and track number moving as an editing process to recording data, comprising:

file generating means for generating the file by gathering a plurality of content units not continuous with each other on the recording medium;

reading means for reading the file and information indicating relative positions of the content units recorded in the recording medium;

dividing means for dividing a content unit included in the file into parts at a discontinuous point and generating information indicating the absolute positions on the recording medium of the respective parts, if the content unit is made of a discontinuous area on the recording medium when the information indicating the relative positions of the content units is read by the reading means;

table storage means for storing a table that associates the information indicating the relative position of the content unit included in the file with the information indicating the absolute position of the parts;

temporary storage means for expanding the file by the parts and the information indicating the absolute position of the parts; and data editing means for executing the editing process including at least any of the dividing, the combining, the erasing and the track number moving for the parts expanded to the temporary storage means.

2. The file management apparatus according to claim 1, wherein the file includes a musical file or a video file.

3. The file management apparatus according to claim 1, wherein when the file is a musical file, the content unit is a track as a segmentation of each musical song, and when the file is a video file, the content unit is a chapter.

4. The file management method for managing a file of content data recorded in a recording medium based on a file system capable of at least dividing, combining, erasing and track number moving as an editing process to recording data comprising:

generating the file by gathering a plurality of content units not continuous to each other on the recording medium;

reading the file and information indicating relative positions of the content units recorded in the recording medium;

dividing a content unit included in the file into parts at a discontinuous point and generating information indicating the absolute positions on the recording medium of the respective parts, if the content unit is made of a discontinuous area on the recording medium when the information indicating the relative positions of the content units is read;

expanding the file by the parts, based on a table that associates the relative position of the content unit included in the file with the information indicating the absolute position of the parts; and executing the editing process including at least any of the dividing, the combining, the erasing and the track number moving for the parts expanded.

5. A file management apparatus for managing a file of content data recorded on a recording medium based on a file system capable of at least dividing, combining, erasing and track number moving as an editing process to recording data, comprising:
- a file generating unit configured to generate the file by gathering a plurality of content units not continuous with each other on the recording medium;
- a reading unit configured to read the file and information indicating the relative positions of the content units recorded in the recording medium;
- a dividing unit configured to divide a content unit included in the file into parts at a discontinuous point and generating information indicating the absolute positions of the recording medium of the respective parts, if the content unit is made of a discontinuous area on the recording medium when the information indicating the relative positions of the content units is read by the reading unit;
- a table storage unit configured to store a table that associates the information indicating the relative position of the content unit included in the file with the information indicating the absolute position of the parts;
- a temporary storage unit configured to expand the file by the parts and the information indicating the absolute position of the parts; and
- a data editing unit configured to execute the editing process including at least any of the dividing, the combining, the erasing and the track number moving for the parts expanded to the temporary storage unit.

* * * * *